US011752940B2

(12) United States Patent
Katagiri et al.

(10) Patent No.: US 11,752,940 B2
(45) Date of Patent: Sep. 12, 2023

(54) DISPLAY CONTROLLER, DISPLAY SYSTEM, MOBILE OBJECT, IMAGE GENERATION METHOD, AND CARRIER MEANS

(71) Applicant: Ricoh Company, Ltd., Tokyo (JP)

(72) Inventors: Keita Katagiri, Kanagawa (JP);
Hiroshi Yamaguchi, London (GB);
Masato Kusanagi, Kanagawa (JP);
Yuuki Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 235 days.

(21) Appl. No.: 17/311,825

(22) PCT Filed: Dec. 3, 2019

(86) PCT No.: PCT/JP2019/047108
§ 371 (c)(1),
(2) Date: Jun. 8, 2021

(87) PCT Pub. No.: WO2020/144974
PCT Pub. Date: Jul. 16, 2020

(65) Prior Publication Data
US 2021/0394677 A1    Dec. 23, 2021

(30) Foreign Application Priority Data
Jan. 11, 2019   (JP) ................................ 2019-003692

(51) Int. Cl.
*B60R 1/00* (2022.01)
*B60W 50/14* (2020.01)
*G06T 11/60* (2006.01)

(52) U.S. Cl.
CPC ............. *B60R 1/001* (2013.01); *B60W 50/14* (2013.01); *G06T 11/60* (2013.01);
(Continued)

(58) Field of Classification Search
CPC ... G06T 11/60; B60R 1/001; B60R 2300/205; B60R 2300/302; B60R 2300/308;
(Continued)

(56) References Cited

U.S. PATENT DOCUMENTS

2010/0253540 A1* 10/2010 Seder ..................... G08G 1/166
348/148
2016/0313562 A1    10/2016 Saisho et al.
(Continued)

FOREIGN PATENT DOCUMENTS

EP         3220237 A1    9/2017
JP       2007-50757 A    3/2007
(Continued)

OTHER PUBLICATIONS

International Search Report and Written Opinion dated Feb. 14, 2020 in PCT/JP2019/047108 filed on Dec. 3, 2019.
(Continued)

*Primary Examiner* — Said Broome
*Assistant Examiner* — Andrew Shin
(74) *Attorney, Agent, or Firm* — XSENSUS LLP

(57) ABSTRACT

A display controller controls a display device provided for a mobile object to display a display image including at least one item of contents of data. The display controller includes an image data acquisition unit configured to obtain image data from an imaging device configured to capture an image around the mobile object, and a display-image generation unit configured to generate the display image. The display-image generation unit changes a display mode of the at least one item of contents of data included in the display image to increase visual recognizability of a desired item of contents of data included in the at least one item of contents of data
(Continued)

to a level at least higher than visual recognizability of an area in the image data not including the desired item of contents of data.

19 Claims, 48 Drawing Sheets

(52) U.S. Cl.
CPC ... *B60R 2300/205* (2013.01); *B60R 2300/302* (2013.01); *B60R 2300/308* (2013.01); *B60R 2300/8093* (2013.01); *B60W 2050/146* (2013.01); *B60W 2554/4042* (2020.02)

(58) Field of Classification Search
CPC .......... B60R 2300/8093; B60W 50/14; B60W 2050/146; B60W 2554/4042
See application file for complete search history.

(56) References Cited

U.S. PATENT DOCUMENTS

| | | |
|---|---|---|
| 2017/0230628 A1 | 8/2017 | Ichikawa et al. |
| 2017/0235140 A1 | 8/2017 | Kusanagi |
| 2017/0269684 A1 | 9/2017 | Murai |
| 2018/0180880 A1 | 6/2018 | Katagiri et al. |
| 2018/0218711 A1 | 8/2018 | Suzuki et al. |
| 2018/0339591 A1 | 11/2018 | Suzuki et al. |
| 2019/0084419 A1 | 3/2019 | Suzuki et al. |

FOREIGN PATENT DOCUMENTS

| | | |
|---|---|---|
| JP | 2007-69806 A | 3/2007 |
| JP | 2007-87337 A | 4/2007 |
| JP | 2010-44561 A | 2/2010 |
| JP | 2013-218671 A | 10/2013 |
| JP | 2015-000629 A | 1/2015 |
| JP | 2016-070951 | 5/2016 |
| JP | 2017-01 3590 | 1/2017 |
| JP | 2017-200808 | 11/2017 |
| JP | 2018-090170 | 6/2018 |
| JP | 2018-106655 A | 7/2018 |
| WO | 2013/118191 A1 | 8/2013 |
| WO | 2015/152304 A1 | 10/2015 |

OTHER PUBLICATIONS

L. Itti, et al., "A model of saliency-based visual attention for rapid scene analysis," IEEE Transactions on Pattern Analysis and Machine Intelligence, vol. 20, No. 11, 1998, pp. 1254-1259.

Jonathan Harel, et al., "Graph-Based Visual Saliency," in Advances in Neural Information Processing Systems 19: Proceedings of the 2006 Conference, MIT Press, 2007, pp. 545-552.

Office Action dated Dec. 13, 2022 in Japanese Patent Application No. 2019-003692, 7 pages.

Communication issued by the Japan Patent Office dated Aug. 30, 2022 for Japanese Patent Application No. 2019-003692.

\* cited by examiner

FIG. 8B
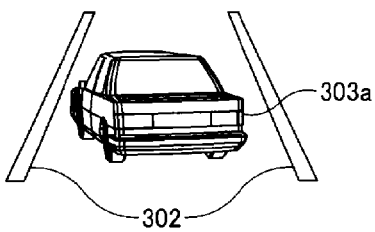
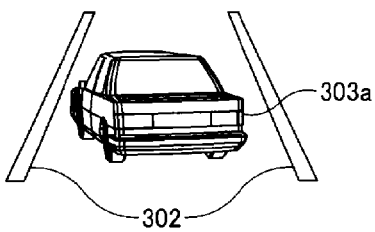

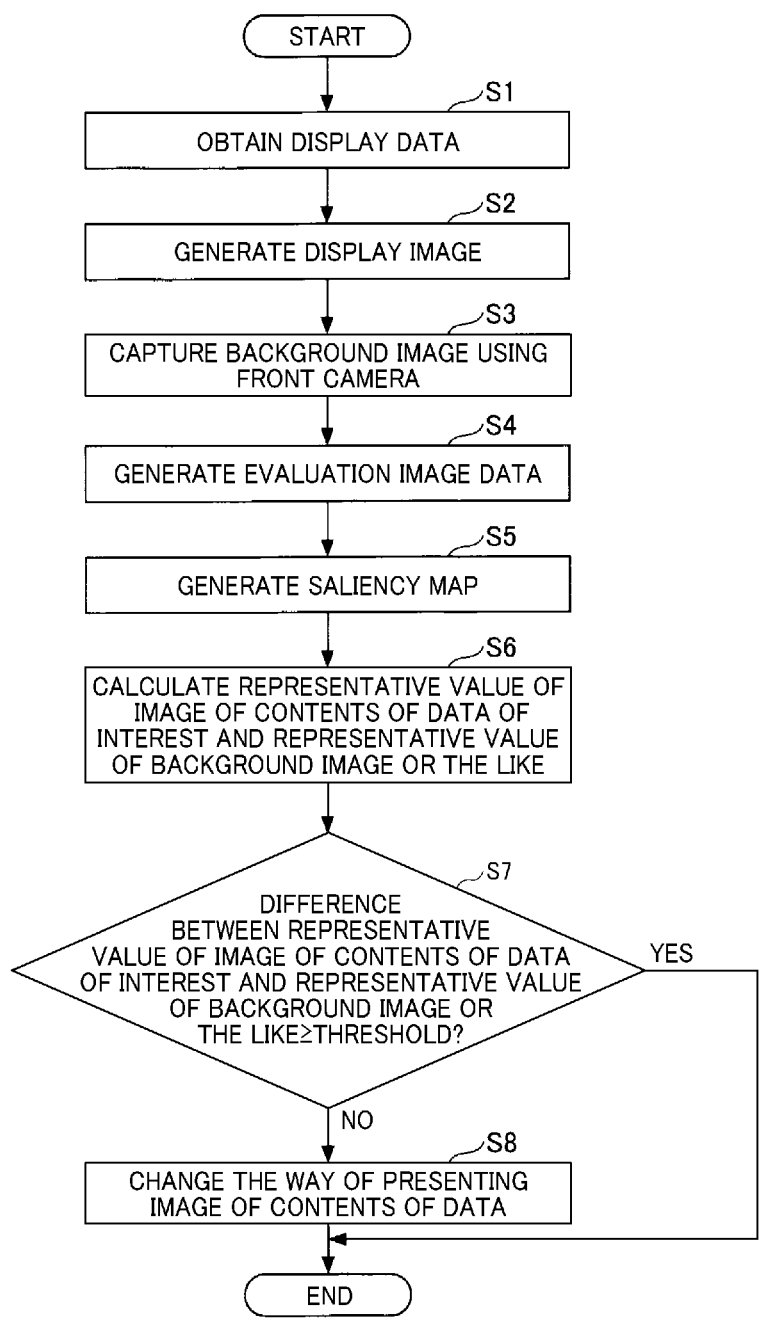

DISPLAY CONTROLLER, DISPLAY SYSTEM, MOBILE OBJECT, IMAGE GENERATION METHOD, AND CARRIER MEANS

TECHNICAL FIELD

Embodiments of the present disclosure relates to a display controller, a display system, a mobile object, an image generation method, and a carrier means.

BACKGROUND ART

Heads-up displays (HUD) are known in the art that enable the occupant of a mobile object such as a vehicle to visually recognize contents of data as a virtual image in the vehicle by projecting various kinds of contents of data onto a front windshield of the vehicle. Such a virtual image appears as if the image is placed ahead of the vehicle beyond the front windshield. Accordingly, the driver of the vehicle who usually sees the view at a long distance can visually recognize the information with a smaller amount of line-of-sight movement compared with cases in which an in-car display is to be viewed.

When a display device including a HUD is used, an image is superimposed on the background image viewed from the eyepoint of the occupant of the vehicle. For this reason, the visual recognizability of the image is easily influenced by the tone of the background image. In order to provide an image with good visual recognizability over the background image, technologies are known in the art to capture the background image ahead of the vehicle using an imaging device and adjust the image to be superimposed on the background image (see, for example, PTL 1). PTL 1 discloses a HUD system that sequentially adjusts the tone of an image so as to maintain a certain level of visual recognizability over the background image.

CITATION LIST

Patent Literature

PTL 1: Japanese Patent Application Publication No. 2018-090170

Non Patent Literature

NPL 1: L. Itti, C. Koch, and E. Niebur. "A model of saliency-based visual attention for rapid scene analysis," IEEE Transactions on Pattern Analysis and Machine Intelligence, Vol. 20, No. 11, pp. 1254 to 1259, 1998.

NPL 2: J. Harel, C. Koch, and P. Perona, "Graph-based visual saliency," Advances in Neural Information Processing Systems, pp. 545 to 552, 2007.

SUMMARY OF INVENTION

Technical Problem

The tone of an image is adjusted in the technologies known in the art. However, the visual recognizability of a desired item of contents of data that are included in the image cannot be adjusted.

Solution to Problem

A display controller controls a display device provided for a mobile object to display a display image including at least one item of contents of data. The display controller includes an image data acquisition unit configured to obtain image data from an imaging device configured to capture an image around the mobile object, and a display-image generation unit configured to generate the display image. The display-image generation unit changes a display mode of the at least one item of contents of data included in the display image to increase visual recognizability of a desired item of contents of data included in the at least one item of contents of data to a level at least higher than visual recognizability of an area in the image data not including the desired item of contents of data.

Advantageous Effects of Invention

According to one aspect of the present disclosure, a display controller can be provided that can adjust the visual recognizability of a desired item of contents of data.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 8A, FIG. 8B, FIG. 8C, FIG. 8D, FIG. 8E, and FIG. 8F are diagrams each illustrating a different display image displayed by a display device, according to an embodiment of the present disclosure.

FIG. 16A-1, FIG. 16A-2, FIG. 16B-1, FIG. 16B-2, FIG. 16C-1, and FIG. 16C-2 are diagrams each illustrating a display mode where the size or thickness of text or character and the brightness are changed and complementary colors are used, according to an embodiment of the present disclosure.

FIG. 17A-1, FIG. 17A-2, FIG. 17B-1, FIG. 17B-2, FIG. 17C-1, FIG. 17C-2, FIG. 17D-1, and FIG. 17D-2 are diagrams each illustrating a change in display mode where the level of color saturation, the distance to a virtual image, or the display position is changed, or flashing is used, according to an embodiment of the present disclosure.

FIG. 18 is a flowchart of the processes in which a display image is generated as a display controller changes the display mode of the contents of data included in the display image, according to the present embodiment.

DESCRIPTION OF EMBODIMENTS

Embodiments of the present disclosure are described below with reference to the accompanying drawings. In particular, a display system and a method of generating an image using the display system are described.

Figure 1A:
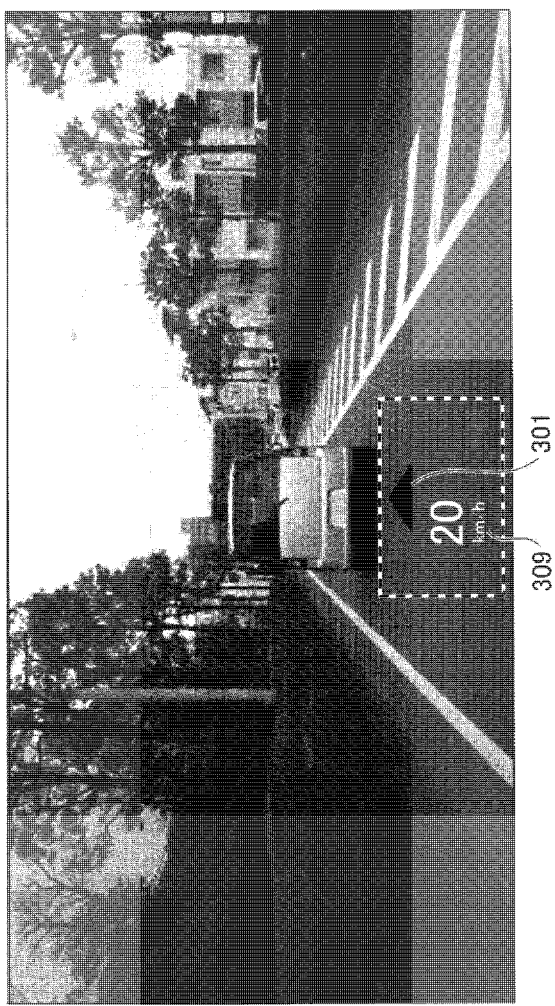
FIG. 1A and FIG. 1B are schematic diagrams illustrating how the contents of data that are displayed on the background image data by a display device are highlighted or inhibited, according to an embodiment of the present disclosure.
Figure 1B:
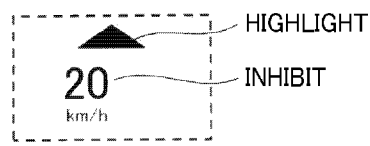

Firstly, a method of generating a display image according to an embodiment of the present disclosure is schematically described with reference to FIG. 1A and FIG. 1B. FIG. 1A and FIG. 1B are schematic diagrams illustrating how the contents of data that are displayed on the background image data by the display device 10 are highlighted or inhibited, according to the present embodiment.

FIG. 1A illustrates the evaluation image data to be evaluated by a display controller 20 as will be described later. In the evaluation image data, a display image displayed by a display device 10 is superimposed on the background image data in which a preceding vehicle is captured. The display image includes a tracking mark 301 for a preceding vehicle and a vehicle speed 309. The elements such as the tracking mark 301 and the vehicle speed 309 that are included in the display image may be referred to as contents of data in the following description.

As the occupant of the vehicle visually recognize the contents of data that are superimposed on the background image, the visual recognizability of the contents of data varies depending on the type of background image. In the related art, a plurality of contents of data could uniformly be highlighted. However, it has been difficult to highlight or inhibit a desired item of contents of data quantitatively depending on the selectively extracted background image.

This is because, when the display controller 20 has the first contents of data to be highlighted and the second contents of data excluding the first contents of data to be highlighted based on the status of the vehicle or when the display controller 20 has the second contents of data to be inhibited and the first contents of data excluding the second contents of data to be inhibited based on the status of the vehicle, how much the image of first contents of data is to be highlighted or how much the image of the second contents of data is to be inhibited has not been evaluated quantitatively.

For example, when the display controller 20 is to highlight the first contents of data, not only the background image but also the second contents of data should be recognized as a part of the background image. However, how much the image of the first contents of data is to be highlighted with respect to the background image and the image of the second contents of data could not quantitatively be evaluated. On the other hand, when the display controller 20 is to highlight the second contents of data, not only the background image but also the first contents of data should be recognized as a part of the background image. However, how much the image of the second contents of data is to be inhibited with respect to the background image and the image of the first contents of data could not quantitatively be evaluated.

In order to handle such a situation, in the present embodiment, a saliency map is generated based on the evaluation image data, and how much the image of the first contents of data is to be highlighted with respect to the background image and the image of the second contents of data is evaluated. Moreover, how much the image of the second contents of data is to be inhibited with respect to the background image and the image of the first contents of data is evaluated. Note also that the distinction is not limited to the distinction between the contents of data of interest and the contents of data excluding the contents of data of interest. More specifically, whether or not a preceding vehicle or the like that could be included in the background image is to be regarded as the background image can be determined. As described above, the visual recognizability of a desired item of contents of data with respect to the selectively extracted background image is adjusted.

By so doing, as illustrated in FIG. 1B, the tracking mark 301 may be highlighted quantitatively, or the vehicle speed 309 may be inhibited quantitatively. The highlighting of the tracking mark 301 and the inhibition of the vehicle speed 309 may be performed at the same time. Moreover, the contents of data to be highlighted and the background image to be inhibited can selectively be extracted, and with respect to what, how much the contents of data to be highlighted are to be highlighted to have a greater level of stimulative properties and characteristics than a threshold or how much the contents of data to be inhibited are to be inhibited to have a lower level of stimulative properties and characteristics than a threshold can quantitatively be determined.

The contents of data to call attention to an object ahead of the vehicle can be highlighted to arouse an attention of the occupant of the vehicle. The contents of data that are constantly displayed such as the vehicle speed, whose importance decreases when the contents of data to call attention to an object ahead of the vehicle are displayed, can be inhibited not to arouse an attention of the occupant of the vehicle. As described above, when a certain image of contents of data is to be highlighted or inhibited with respect to other images of contents of data, the other images of contents of data that are neither highlighted nor inhibited are regarded as the background image. However, any desired item of contents of data can be highlighted or inhibited with respect to the selectively extracted background image. While the background image continuously changes while the vehicle is travelling and the background image may include, for example, a preceding vehicle, whether the visual recognizability of the contents of data is to be highlighted or inhibited with respect to the background image including such a preceding vehicle can be determined or whether the visual recognizability of the contents of data is to be highlighted or inhibited with respect to the background image not including such a preceding vehicle can be determined in an adjustable manner.

The term "saliency" is an index for the visual recognizability of human, and the term "saliency map" indicates the estimated degree of visual recognizability with respect to each pixel of the image. On such a saliency map, a pixel with greater visual recognizability for human takes a greater evaluation value. As such an evaluation value is associated with the density, a pixel with greater visual recognizability for human can be displayed as a brighter image. Alternatively, the evaluation value may be expressed by hue.

The occupant of the vehicle indicates a person who visually recognizes the information displayed by the display device 10. For example, the occupant is a driver. However, the occupant may simply be an occupant. In the case of a mobile object that travels by automatic driving, the occupant may not at all drive the mobile object.

The term "mobile object" is satisfactory as long as at least one occupant rides on the mobile object and the mobile object travels on the ground, in the air, on the sea, or in the sea. In the present embodiment, cases in which the mobile object is a vehicle are described. For example, the display device 10 may be provided for an aircraft, ship, and an industrial robot.

The term "display data" indicates the data that is displayed by the display device 10, and the term "display image" indicates the image data based on the display data. The display image is generated based on at least one item of display data. The term "contents of data" indicates a plurality of items of display data that are included in the display image.

The term "display mode" indicates the outward appearances of a displayed image. Changing the display mode corresponds to changing the outward appearances. In the present embodiment, highlighting and inhibition are performed to change the display mode. The term "highlighting" indicates enhancing the stimulative properties and characteristics of the contents of data, and the term "inhibition" indicates lowering the stimulative properties and characteristics of the contents of data. For example, highlighting may be regarded as achieving better viewability, attracting the attention, enhancing the visual recognizability, making the object noticeable.

For example, inhibition may be regarded as achieving poorer viewability, attracting less attention, reducing the visual recognizability, making the object less noticeable.

The display data that is displayed by the display device 10 includes the vehicle-related information, the driving environment information, the occupant status information, and the information that is derived from those items of information. The display data that is displayed by the display device 10 is useful information for driving the mobile object from a qualitative point of view. Whether the information is actually reflected in driving does not matter in the present embodiment. Concrete examples of those items of information in the present embodiment are given below, but no limitation is intended thereby.

Vehicle-related Information: Various kinds of information that can be obtained from a vehicle such as the vehicle speed, the remaining fuel, the operative position of a shift lever, the total mileage, the sectional mileage, the state of a direction indicator, and, the water temperature.

Driving Environment Information: Various kinds of information such as the status of various kinds of controls based on the information detected by various kinds of sensors such as a light detection and ranging (LiDAR) device and a camera, the desirable operations performed by the occupant of the vehicle, the traffic congestion information received by a vehicle information communication system (VICS, registered trademark) receiver, the information about traffic accident, the environmental information related to driving such as the weather information. Moreover, for example, the information about the directions of travel and the traffic signs, which is supplied by a navigation system, may be included in the driving environment information.

Occupant Status Information: Various kinds of information such as the electrocardiogram information of the occupant of the vehicle, the heart rate, the blood pressure, the body temperature, the beat of the pulse, the breathing rate, the amount of perspiration, the level of blinking or pupil (arousal level), the electrical brain waves, and the myoelectric potential, or the information about the physical and mental state determined based on these items of information.

Figure 2:
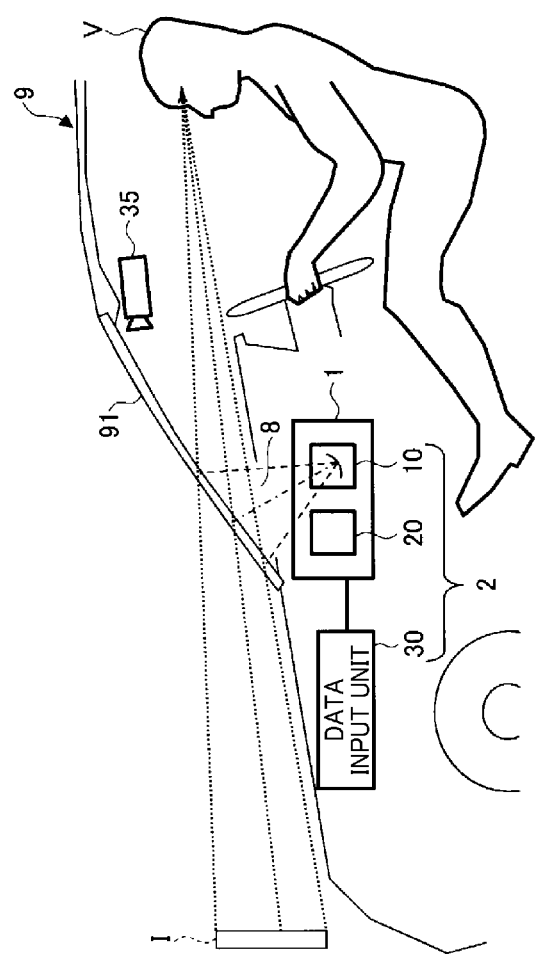
FIG. 2 is a diagram illustrating a schematic configuration of a vehicle-installed system according to an embodiment of the present disclosure.

FIG. 2 is a schematic diagram illustrating a vehicle-installed system 2 according to an embodiment of the present disclosure. The vehicle-installed system 2 is provided for a vehicle 9, and includes data input unit 30, a front camera 35, and the display system 1. Further, the display system 1 includes a display controller 20 and a display device 10. Firstly, the data input unit 30 obtains the above input data and sends the obtained input data to the display system 1, as will be described later in detail.

The display system 1 is embedded in the dashboard, and projects an image towards a front windshield (transmissive reflector) 91 through an exit window 8 arranged on the top surface of the display system 1. The projected image is displayed ahead of the front windshield 91 as a virtual image I. The occupant V of the vehicle can visually check useful information for driving with a smaller amount of line-of-sight movement while keeping the line of sight on the preceding vehicle or the road surface. The display system 1 is satisfactory as long as it can project an image towards the front windshield 91, and may be placed on, for example, the ceiling panel or a sun visor of the vehicle, in place of the dashboard.

The display system 1 may be a general-purpose information processing terminal or a HUD-dedicated terminal. The HUD-dedicated terminal may be referred to simply as a heads-up display, or may be referred to as a navigation system when the HUD-dedicated terminal is integrated into a navigation system. Alternatively, the HUD-dedicated terminal may be referred to as a portable navigation device (PND), a display audio, or a connected audio. When the HUD-dedicated terminal is referred to as a display audio, such a device does not provide navigation functions but provides, for example, audio video functions and communication capability.

A general-purpose information processing terminal may be, for example, a smartphone, a tablet personal computer (PC), a mobile phone, a personal digital assistance (PDA), a laptop PC, a wearable PC (e.g., a wristwatch-type wearable PC and a sunglass-type wearable PC). However, no limitation is intended thereby, and a general-purpose information processing terminal is satisfactory as long as it has the general functions of information processing devices. A general-purpose information processing terminal is usually used as an information processing apparatus that executes various kinds of applications. However, for example, when application software for the display system is to be executed, a general-purpose information processing terminal displays useful information for driving in a similar manner to a HUD-dedicated terminal.

The display system 1 according to the present embodiment may be switchable between a vehicle-installed state and a portable state regardless of whether the display system 1 is a general-purpose information processing terminal or a HUD-dedicated terminal.

As illustrated in FIG. 2, the display system 1 includes the display device 10 and the display controller 20 as elements. The display device 10 according to the present embodiment may adopt the laser scanning system or the panel system as known in the art, as its projection system. In the laser scanning system, an intermediate image (i.e., a real image projected onto a screen as will be described later in detail) is formed by scanning a laser beam emitted from a laser beam source, using a two-dimensional scanning device. In the panel system, an intermediate image is formed by an imaging device such as a liquid crystal panel, a digital micromirror device (DMD) panel (digital mirror device panel), and a vacuum fluorescent display (VFD).

Unlike the panel system where an image is formed by partial light blocking over the full-screen emission, the laser scanning system is preferable because emitting/non-emitting can be assigned to each pixel and a high-contrast image can be formed in most cases. When a high-contrast image can be obtained, the visual recognizability increases. Accordingly, in the laser scanning system, the occupant of a vehicle can visually recognize the information with smaller attentional resources than the attentional resources required when a HUD of the panel system is adopted.

In particular, in the panel system, the light that cannot be shielded is projected even to an area with no information, and an unwanted frame tends to be projected to a range where the HUD can display an image (this phenomenon may be referred to as a postcard effect). By contrast, no such phenomenon is observed in the laser scanning system, and only the image of contents of data can be projected in the laser scanning system. In particular, the reality improves when the image of generated video data is superimposed on the existing scenery in the augmented reality (AR). The augmented reality (AR) is the technologies for virtually expanding the real-world environment by overlaying the image of an unreal object on the existing scenery. However, no limitation is indicated thereby, and a HUD of the panel system is satisfactory as long as it can highlight or inhibit the image of contents of data in a preferable manner.

The front camera 35 is an imaging device that captures images ahead of the vehicle. As illustrated in FIG. 2, the front camera 35 is arranged in the room of the vehicle, and the front camera 35 captures an image ahead of the vehicle through the front windshield 91. The front camera 35 obtains, for example, the image data used for object recognition by capturing a pedestrian or a preceding vehicle, the image data used to obtain the distance information, and the image data in which the environmental information while the vehicle is traveling is recorded (as obtained by a drive recorder). In the present embodiment, a saliency map is generated as the display image is combined with the image data obtained by the front camera 35. The front camera 35 may be either a monocular camera or a stereo camera. It is further preferable if a camera that captures the images around the vehicle is provided in addition to the front camera 35.

The front camera 35 that is dedicated to capture the images of the background may be provided for the vehicle. In such a configuration, it is desired that the display image that is projected through the front windshield 91 be captured together with the background image. The virtual image I is visually recognizable only from a relatively narrow area called eye box. For this reason, the front camera 35 may be arranged, for example, near the headrest. Alternatively, the front camera 35 may be built into the glasses of the occupant of the vehicle, or the front camera 35 of ear-hung type may be used.

Figure 3:
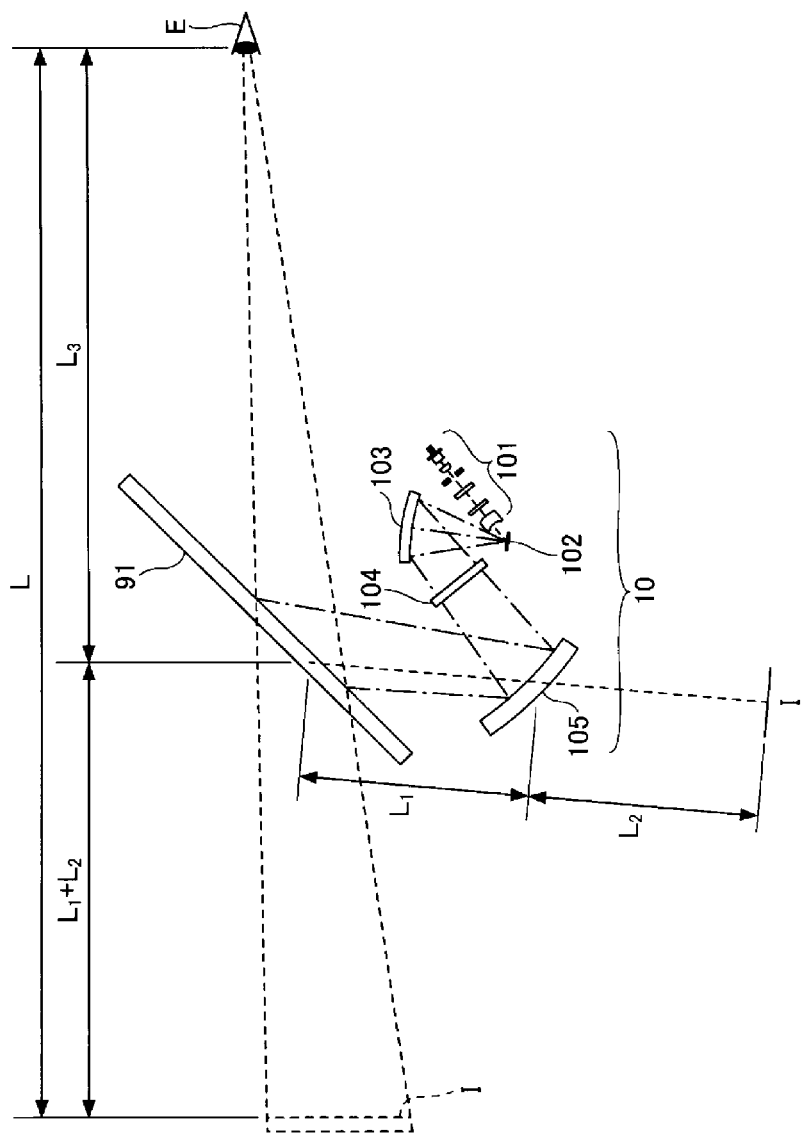
FIG. 3 is a diagram illustrating a configuration of an display device according to an embodiment of the present disclosure.

FIG. 3 is a diagram illustrating a configuration of the display device 10 according to the present embodiment. The display device 10 includes a light source unit 101, a light deflector 102, a mirror 103, a screen 104, and a concave mirror 105. However, no limitation is indicated thereby, and the display device 10 may include other elements not illustrated in FIG. 3. Moreover, it is not necessary for the display device 10 to include all the elements illustrated in FIG. 3.

The light source unit 101 includes, for example, three laser beam sources that correspond to red, green, and blue (RGB) (each of which is referred to as a laser diode (LD) in the following description), coupling lenses, apertures, combiners, and lenses, and the laser beams that are emitted from the three LDs are combined and guided and directed to the reflection plane of the light deflector 102. The laser beams that are guided to the reflection plane of the light deflector 102 are two-dimensionally deflected by the light deflector 102.

For example, one micromirror that pivots around the two axes that are perpendicular to each other or two micromirrors that pivots around or rotate on one axis may be used as the light deflector 102. For example, the light deflector 102 may be a micro-electromechanical systems (MEMS) mirror that is manufactured by any process such as the semiconductor processing. For example, the light deflector 102 may be driven by an actuator whose driving force is the deforming force of a piezoelectric element. As the light deflector 102, for example, a galvano minor or a polygon minor may be used.

The laser beams that are two-dimensionally deflected by the light deflector 102 are incident on the mirror 103, and are reflected and turned by the mirror 103. As a result, a two-dimensional image (intermediate image) is drawn on the surface (to-be-scanned surface) of the screen 104. For example, a concave mirror can be used as the mirror 103. Alternatively, a convex mirror or plane minor may be used as the mirror 103. The display device 10 can be downsized or the arrangement of the elements can flexibly be changed by deflecting the laser beams by the light deflector 102 and the mirror 103 to change the directions of the laser beams.

As the screen 104, it is preferable to use a microlens array (MLA) or a micromirror array through which laser beams diverge at a desired divergence angle. However, no limitation is indicated thereby, and a diffuser panel through which laser beams diffuse at a desired divergence angle, a transparent plate or reflector whose surfaces are smooth, or the like may be used.

The laser beams that are emitted from the screen 104 are reflected by the concave mirror 105, and are projected onto the front windshield 91. The concave minor 105 has a function similar to lenses and has the function of forming an image at a predetermined focal length. Accordingly, assuming that the concave minor 105 serves as a lens, an image on the screen 104, which corresponds to an object, is formed at the distance L2 that is determined by the focal length of the concave mirror 105. Accordingly, when viewed from the occupant of the vehicle, the virtual image I is displayed at the distance of L1 and L2 from the front windshield 91. Assuming that the distance between the occupant of the vehicle and the front windshield 91 is L3, as illustrated in FIG. 3, the virtual image I is displayed (formed) at distance L (=L1+L2+L3) with reference to a viewpoint E of the occupant V of the vehicle.

At least some of the light flux to the front windshield 91 is reflected towards the viewpoint E of the occupant V of the vehicle. As a result, the occupant V of the vehicle can visually recognize the virtual image I, which is a magnified view of the intermediate image on the screen 104, through the front windshield 91. In other words, the virtual image I, which is a magnified view of the intermediate image, is displayed through the front windshield 91 when viewed from the occupant V of the vehicle.

Typically, the front windshield 91 is not flat but is slightly curved. For this reason, the image-forming position of the virtual image I is determined not only by the focal length of the concave mirror 105 but also by the curved surface of the front windshield 91, but the distance L is substantially determined by the distance L1+L2 as described above. When it is desired that the virtual image I be formed at a long distance so as to minimize the line-of-sight movement, the distance L1 or the distance L2 is lengthened. In order to lengthen the distance L1, the optical path may be turned by a minor. In order to lengthen the distance L2, the focal length of the concave minor 105 may be adjusted.

As the optical deformation in which the horizontal line of the intermediate image is distorted to be convex upward or downward is caused due to the effect of the front windshield 91, it is desired that at least one of the mirror 103 and the concave mirror 105 be designed and arranged so as to correct the optical deformation. Alternatively, it is desired that the projected image be corrected in view of the optical deformation.

A combiner may be arranged as a transmissive reflector on the viewpoint E side of the front windshield 91. Also in a configuration where a combiner is irradiated with the light reflected by the concave mirror 105, the virtual image I can be displayed in a similar manner to cases in which the front windshield 91 is irradiated with the light reflected by the concave mirror 105.

Figure 4:
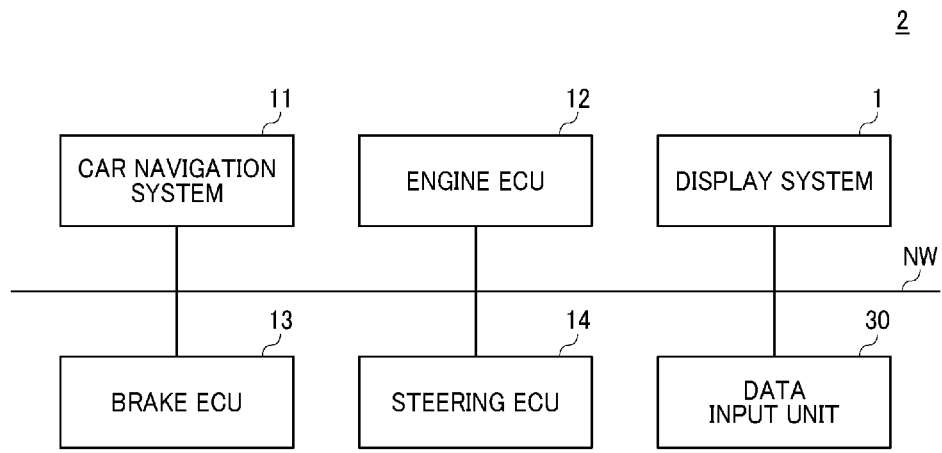
FIG. 4 is a block diagram illustrating a vehicle-installed system provided with a display system, according to an embodiment of the present disclosure.

A configuration in which the display system 1 is provided for a mobile object is described below with reference to FIG. 4. FIG. 4 is a block diagram illustrating a vehicle-installed system 2 in which the display system 1 is provided for a mobile object, according to the present embodiment. The vehicle-installed system 2 includes a car navigation system 11, an engine electronic control unit (ECU) 12, the display system 1, a brake ECU 13, a steering ECU 14, and the data input unit 30, each of which performs communication through an in-vehicle network (NW) such as a controller area network (CAN) bus.

The car navigation system 11 has a global navigation satellite system (GNSS) as typified by a global positioning system (GPS), and detects the current location of the vehicle and displays the position of the vehicle on the electronic chart. The car navigation system 11 accepts the input of the place of departure and the destination, sand searches for the path from the place of departure to the destination. Moreover, the car navigation system 11 displays the position of the vehicle on the electronic chart, or guides the directions of travel to the occupant of the vehicle when the direction is to be changed soon, using, for example, voice, characters (that are displayed on a display), or animation. The car navigation system 11 may communicate with a server via, for example, the mobile phone network. In such a configuration, the server may send the electronic chart to the vehicle 9 or may search for the route.

An engine electronic control unit (ECU) 12 determines an optimal amount of fuel injection, advances or retards the ignition timing, or controls, for example, a valve mechanism, in view of the data obtained by various kinds of sensors and the status of the vehicle. For example, the engine ECU 12 refers to a map in which the shift lines for transmission are defined in response to the relation between the current vehicle speed and the degree of opening of the accelerator, and determines the necessity of speed change. The engine ECU 12 combines these kinds of controls to perform acceleration and deceleration control when the vehicle is tracking the preceding vehicle.

Even if the occupant of the vehicle does not press down on the brake pedal, the brake ECU 13 controls the braking and stopping power for each wheel of the vehicle. For example, control may be performed by an antilock braking system (ABS), or brake control may be performed when the vehicle is tracking the preceding vehicle. Moreover, automatic braking may be performed based on the time to collision (TTC) with an obstacle, or the stopped state may be maintained at hill start.

The steering ECU 14 detects the steering direction of the steering wheel and the amount of steering performed by the occupant of the vehicle, and performs power steering control to add steering torque in the steering direction. Even when the steering wheel is not operated by the occupant of the vehicle, the steering ECU 14 performs steering operation in a direction that prevents the vehicle from running off the traffic lane, in a direction that keeps the vehicle traveling forward in the center of the traffic lane, or in a direction that prevents the vehicle from approaching an obstacle.

Figure 5:
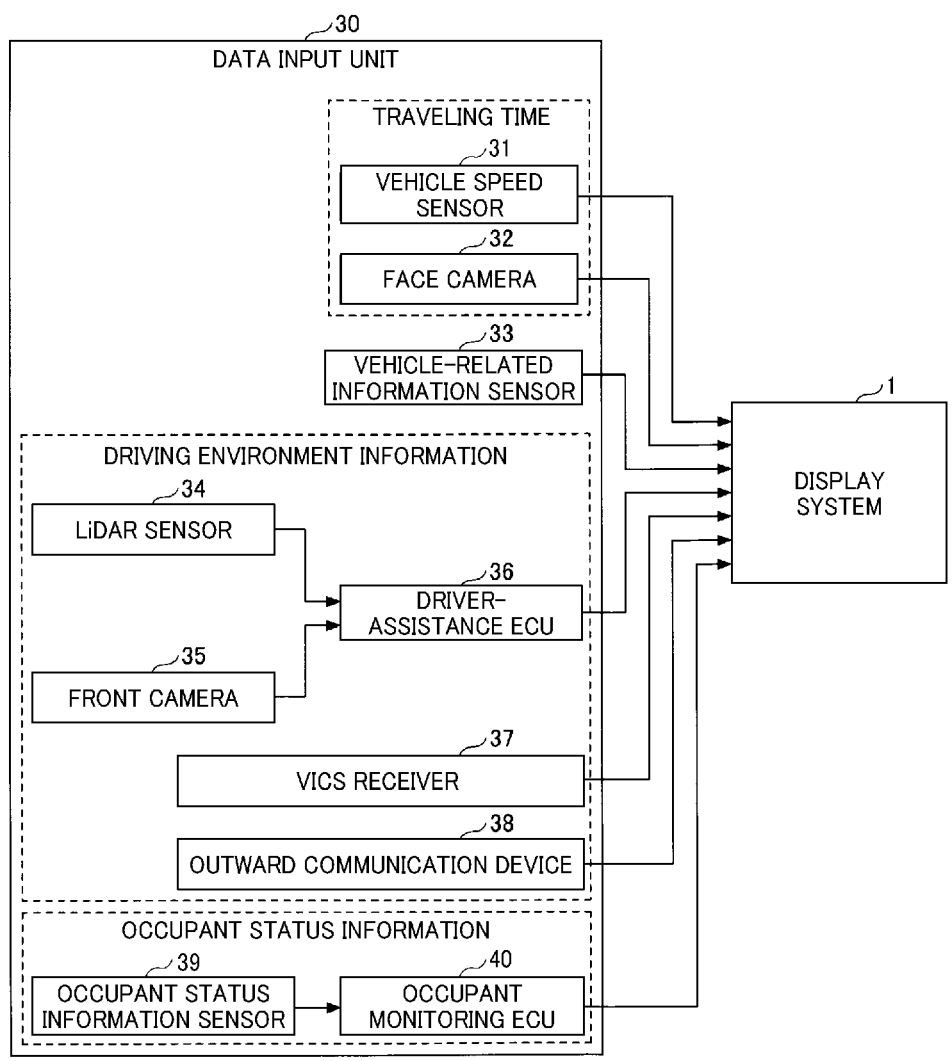
FIG. 5 is a diagram illustrating a configuration or structure of a data input unit of a vehicle-installed system, according to an embodiment of the present disclosure.

The data input unit 30 is described below with reference to FIG. 5. The display system 1 can obtain the input information from the data input unit 30. The display system 1 may obtain information from an external network instead of the in-vehicle network NW.

A configuration of the data input unit 30 and the input data that is input by the data input unit 30 are described below with reference to FIG. 5. FIG. 5 is a diagram illustrating a configuration or structure of the data input unit 30 of the vehicle-installed system 2, according to the present embodiment. The input information (that includes the traveling time, the driving environment information, and the occupant status information) may be partly displayed by the display device 10 or may be displayed by the display device 10 in its entirety.

The data input unit 30 obtains the above input data, and inputs the obtained input data to the display device 10. The data input unit 30 includes a face camera 32 and a vehicle speed sensor 31 used to obtain the traveling time, a vehicle-related information sensor 33 that obtains the vehicle-related information to be displayed by the display device 10, a light detection and ranging (LiDAR) sensor 34 and a front camera 35 that detect an object to obtain the driving environment information, a driver-assistance ECU 36 that assists the driving in relation to the object, a vehicle information communication system (VICS) receiver 37 and an outward communication device 38 that receive the driving environment information from an external device, an occupant status information sensor 39 that obtains the occupant status information, and an occupant monitoring ECU 40 that monitors the occupant based on the occupant status information.

The vehicle speed sensor 31 has a sensor unit fixed to the car body, and the sensor unit detects a magnet that rotates together with a shaft of a drive train system. Moreover, a pulse wave proportionate to the rotation speed is generated, and the vehicle speed can be detected based on the number of the pulses per unit time. The face camera 32 captures the face of the occupant of the vehicle and performs face recognition to identify or visually recognize the occupant of the vehicle. Due to this configuration, the display system 1 can measure the traveling time for each occupant of the vehicle. Note also that the vehicle speed sensor 31 is a part of the vehicle-related information sensor 33.

The vehicle-related information sensor 33 includes an at least one sensor that detects the vehicle-related information other than the vehicle-related information detected by the vehicle speed sensor 31. For example, the vehicle-related information sensor 33 includes a fuel-gauge sensor, a shift-lever position sensor, an odometer, a tripmeter, a winker sensor (direction indicator sensor), and a water temperature sensor. However, no limitation is indicated thereby, and the vehicle-related information sensor 33 is satisfactory as long as it can obtain various kinds of vehicle-related information. The fuel-gauge sensor detects the current remaining fuel. The shift-lever position sensor detects the position of the shift lever manipulated by the occupant of the vehicle. The odometer accumulates the mileage of the vehicle to provide the total mileage. The tripmeter provides a sectional mileage between the point in time when the occupant of the vehicle initialized the tripmeter and the present time. The winker sensor (direction indicator sensor) detects the direction indicated by a winker (direction indicator) manipulated by the occupant of the vehicle. The water temperature sensor detects the temperature of engine cooling water. These items of information are merely an example of the information obtainable from the vehicle, and any other items of information obtainable from the vehicle can be the vehicle-related information. In the case of an electric-powered vehicle and a hybrid electric-internal combustion vehicle (hybrid car), for example, the remaining power in a battery, the amount of regenerative electric power, or the amount of power consumption may be obtained.

The LiDAR sensor 34 transmits radio signals around the vehicle. For example, in particular, the radio signals are transmitted ahead of the vehicle. Then, the LiDAR sensor 34 receives the returning radio signals as reflected by an object. A time-of-flight (TOF) method is known in the art where the distance to the object is measured based on the length of time between the instant when radio signals are transmitted and the instant when radio signals are reflected and received and the direction in which the object is placed is detected based on the direction in which the radio signals are transmitted. Alternatively, a method using the fast chirp modulation (FCM) and a method using the frequency modulation continuous wave (FMCW) are known in the art in which a mixed wave of a received wave and a transmitted wave is generated while continuously increasing the frequency of a transmitted wave and a beat frequency of a mixed wave that is caused by a slight difference in frequency is converted into distance. In such a method using the FCM and a method using the FMCW, the direction in which the object is placed is estimated by detecting a phase shift in received wave using a plurality of receiving antennas.

The front camera 35 is an imaging device that captures images ahead of the vehicle. The position at which the front camera 35 is attached is satisfactory as long as it can capture ahead of the camera. For example, the front camera 35 may be attached to the rear side of the rear-view mirror or near the rear-view minor. The driver-assistance ECU 36 recognizes, for example, pedestrians, preceding vehicles, road signs, and painting on the road such as a white line, based on the image data captured by the front camera 35. The front camera 35 may be either a monocular camera or a stereo camera. In the case of a monocular camera or a stereo camera that can obtain distance information, the LiDAR sensor 34 is not always necessary. However, when the LiDAR sensor 34 is used in addition to the front camera 35 that can obtain distance information, fusion between the distance information obtained by the front camera 35 and the distance information obtained by the LiDAR sensor 34 can be performed, and distance information of high degree of precision in which the disadvantages of a pair of items of distance information are complemented each other can be obtained. In addition to the LiDAR sensor 34 and the front camera 35, for example, a sonic sensor (ultrasonic sensor) may be provided. Alternatively, a rear camera or a side camera may be provided in addition to the front camera 35.

The driver-assistance ECU 36 performs various kinds of driver assistance based on the distance information of the object detected by at least one of the LiDAR sensor 34 and the front camera 35, in cooperation with the engine ECU 12, the brake ECU 13 and the steering ECU 14. For example, acceleration and deceleration control when the vehicle is tracking the preceding vehicle, automatic braking, prevention of the vehicle from running off the traffic lane, lane-keeping, and steering to avoid an obstacle as described above are performed. In the acceleration and deceleration control, the driver-assistance ECU 36 controls the motive power and the braking and stopping power so as to maintain the desired distance that varies depending on the vehicle speed. In the automatic braking, for example, an alert image or sound that calls attention to the occupant of the vehicle, an image that prompts the driver to press down on the brake pedal, and rolling up of the seatbelt and anti-collision braking when there is a high probability of collision are performed depending on the time to collision (TTC) In the prevention of the vehicle from running off the traffic lane, the driver-assistance ECU 36 recognizes the white lines (lines that divide traffic lanes) from the captured image data, and adds steering torque to the direction opposite to the direction of running off the traffic lane. In lane keeping, the center of the traffic lane is set as the target driving line, and steering torque proportional to the deviation from the target driving line is added to the direction opposite to the deviation. In the steering to avoid an obstacle, when it is determined that the collision cannot be avoided by braking, a driving line for avoiding the obstacle is determined, and steering torque for traveling along the determined driving line is added is added.

Moreover, the driver-assistance ECU 36 detects that the preceding vehicle is driving off, and instructs the display system 1 to sound an alarm or display an image to encourage the occupant of the vehicle to start driving. Further, the driver-assistance ECU 36 detects that the steering wheel is not operated for a long time, and instructs the display system 1 to sound an alarm or display an image to encourage the occupant of the vehicle to hold the steering wheel.

In accordance with such controls as above, the driver-assistance ECU 36 instructs the display system 1 to output, for example, at least one of various kinds of image (icon) and characters (texts). Some example displays are described below with reference to FIG. 8A, FIG. 8B, FIG. 8C, FIG. 8D, FIG. 8E, and FIG. 8F. Alternatively, the driver-assistance ECU 36 may instruct the display system 1 to sound an alarm.

The VICS receiver 37 receives a radio or radar signal distributed by the VICS. Note that the vehicle information communication system (VICS) is a system that transmits the traffic information such as traffic congestion and traffic restrictions to a vehicle-installed device in real time using frequency modulation (FM) multiplex broadcasting or a beacon. The outward communication device 38 is connected to the Internet or the like via the network such as of 3G, 4G, 5G, LTE, and wireless LAN, and receives various kinds of information. For example, the outward communication device 38 can receive weather information such as of rain, snow, and fog. Alternatively, the outward communication device 38 may receive, for example, news, music, and video data. Moreover, the outward communication device 38 can obtain, for example, the status information of a traffic signal and the time it takes before the signal changes. As described above, the VICS receiver 37 and the outward communication device 38 may perform road/automobile communication. Further, the outward communication device 38 may obtain the information detected by another vehicle through car-to-car communication.

The occupant status information sensor 39 is an sensor that obtains the occupant status information that is directly or indirectly detected from the occupant of the vehicle. The occupant status information sensor 39 is, for example, an electrocardiogram sensor, a heart rate sensor, a blood pressure sensor, a body temperature sensor, a pulse sensor, a respiration sensor, a perspiration sensor, a blinking sensor, a pupil sensor, a brain wave sensor, or a myoelectric potential sensor. For example, a wristwatch-type wearable device (smart watch) that is worn by the occupant of the vehicle may serve as the occupant status information sensor 39. An electrode is disposed on the rear of the wearable device and at a part of the wearable device other than the rear of the wearable device, respectively, and such electrodes detect electric current when a user touches for certain length of time the electrode that is disposed at a part of the wearable device other than the rear of the wearable device. As the electric current reflects the myocardial activity, electrocardiogram information can be obtained by analyzing the electric current. The heart rate can be derived from the electrocardiogram information, and the breathing rate is obtained in view of the fact that the impedance (electrical resistance) between a pair of electrodes changes according to the respiration. A light-emitting diode (LED) light source and a photodiode (PD) may be provided for the wearable device, and the photodiode receives the light reflected from the blood vessels that are irradiated by the LED. As the density of erythrocytes (red blood cells) changes according to the pulsation of the heart rate, the heart rate information and the pulse information are obtained by analyzing the changes in the density of erythrocytes. The blood pressure information can be obtained from the heart rate and the flow of blood. The body temperature information can be detected by a temperature sensor, and the perspiration information is detected as, for example, the degree of moisture content or humidity. The myoelectric potential is a change in electrical potential on the surfaces of skin caused by the movement of muscles, and is obtained by analyzing the signals of an electrode pasted on a specific area of the muscles. The blinking information and pupil information are obtained by analyzing the facial images that are captured by the face camera 32. The drowsiness can be estimated by monitoring the eyes of the face and how much the eyes are open. Moreover, the drowsiness (arousal level) can be estimated by detecting the black points of the eyes in the center as pupils. Further, the brain waves can be detected in a non-invasive manner using a sensor of head band type or helmet type in which a plurality of electrodes are inwardly arranged.

The occupant status information sensor 39 may communicate with the display system 1 through a wireless connection such as Bluetooth (registered trademark), or may communicate through a wired connection such as a universal serial bus (USB) cable. Some concrete examples of the occupant status information and the occupant status information sensor 39 are described as above, but no limitation is intended thereby. Some examples of how the occupant status information is analyzed are described as above, but no limitation is indicated thereby, and any method of analyzing the occupant status information may be used.

The occupant monitoring ECU 40 outputs the results of monitoring the occupant of the vehicle to the display system 1 based on the occupant status information. For example, the occupant monitoring ECU 40 instructs the display system 1 to output at least one of a message or image saying "Stop driving right now" or "Take a break" when a sign of ventricular fibrillation is observed from the electrocardiogram information, when the heart rate, pulse, or the breathing rate is equal to or higher than a threshold, when the blood pressure is equal to or higher than a threshold or when the blood pressure is lower than a threshold, when the body temperature is equal to or higher than a threshold, when the amount of perspiration is equal to or larger than a threshold, when it is determined that the arousal level is low, when some abnormalities are observed in the brain wave, or when it is determined that some muscles are tired. Alternatively, the occupant status information may be displayed in a direct manner, or the occupant monitoring ECU 40 may instruct the display system 1 to sound an alarm.

Figure 6:
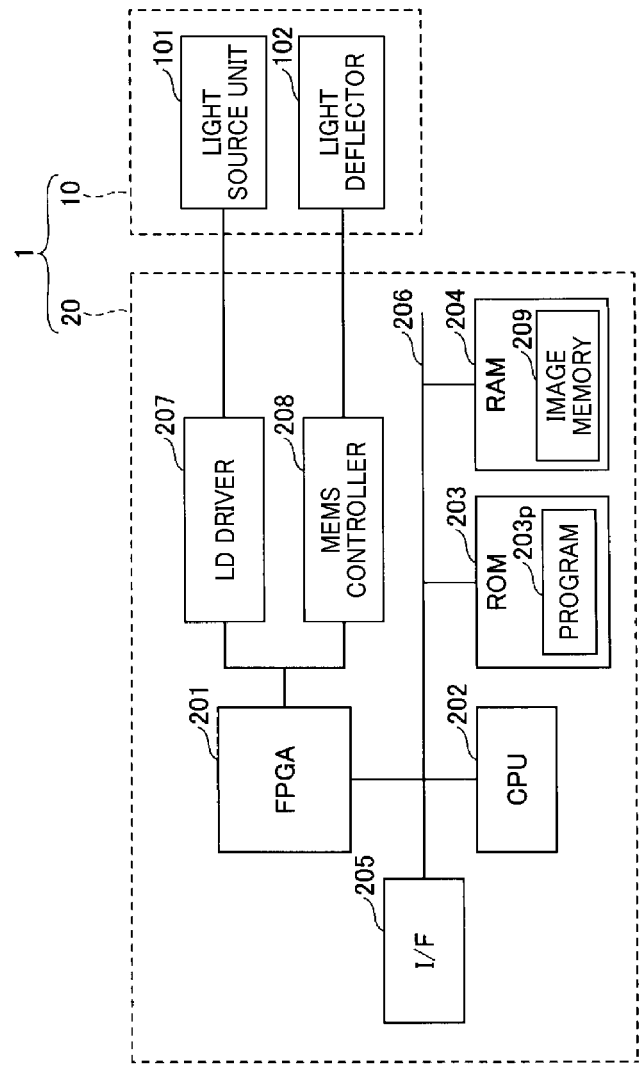
FIG. 6 is a diagram illustrating a hardware configuration of a display controller according to an embodiment of the present disclosure.

A hardware configuration of the display controller 20 according to the present embodiment is described below with reference to FIG. 6. FIG. 6 is a diagram illustrating a hardware configuration of the display controller 20 according to the present embodiment. The display controller 20 includes a field-programmable gate array (FPGA) 201, a central processing unit (CPU) 202, a read only memory (ROM) 203, a random access memory (RAM) 204, an interface (I/F) 205, a bus line 206, a laser diode (LD) driver 207, and a micro-electromechanical systems (MEMS) controller 208. The FPGA 201, the CPU 202, the ROM 203, the RAM 204, and the interface 205 are interconnected through the bus line 206.

The CPU 202 controls the multiple functions of the display controller 20. The ROM 203 stores a program 203$p$ that is executed by the CPU 202 to control the multiple functions of the display controller 20. The RAM 204 is used as a work area in which the program 203$p$ is developed and the CPU 202 executes the program 203$p$. The RAM 204 includes an image memory 209. The image memory 209 is used to generate an image to be projected as a virtual image I. The interface 205 is an interface used to communicate with the data input unit 30, and is connected to, for example, a controller area network (CAN) bus of the vehicle 9 or the Ethernet (registered trademark).

The FPGA 201 controls the LD driver 207 based on the image generated by the CPU 202. The LD driver 207 drives the laser diodes (LDs) of the light source unit 101 of the display device 10 to control the light emission of the LDs based on the image. The FPGA 201 drives the light deflector 102 of the display device 10 through the MEMS controller 208 such that the laser beams will be deflected in a direction corresponding to the position of each pixel of the image.

Figure 7:
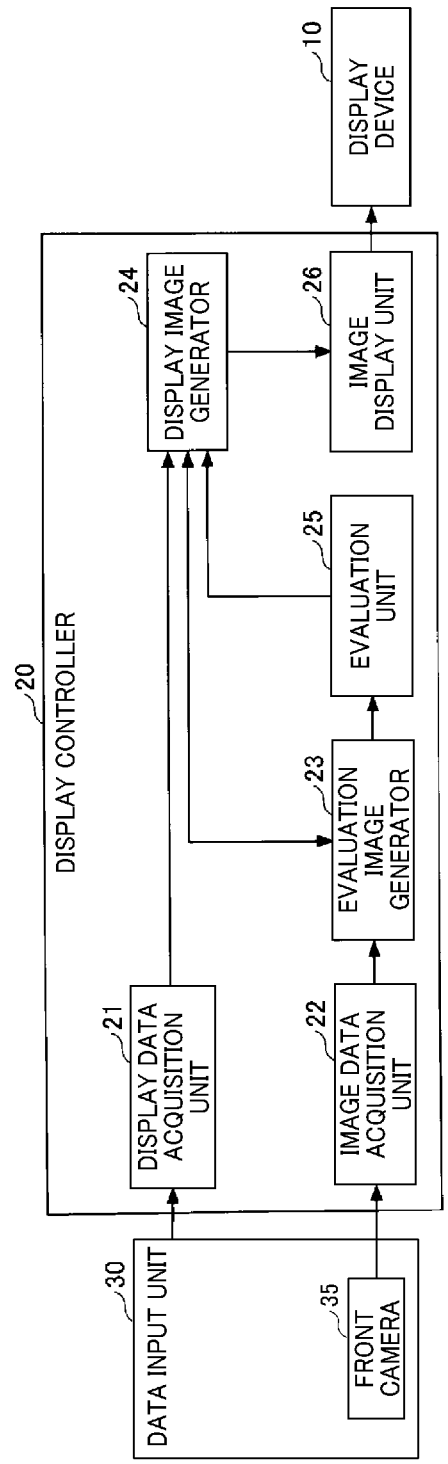
FIG. 7 is a functional block diagram of a display controller according to an embodiment of the present disclosure.

A functional configuration of the display controller 20 according to the present embodiment is described below with reference to FIG. 7. FIG. 7 is a functional block diagram of the display controller 20 according to the present embodiment. The display controller 20 a display data acquisition unit 21 an image data acquisition unit 22 an evaluation image generator 23 a display image generator 24 an evaluation unit 25, and includes an image display unit 26. These functions of the display controller 20 are implemented as the CPU 202 executes the program 203p developed from the ROM 203 to the RAM 204 of the display controller 20.

The display data acquisition unit 21 obtains the display data to be displayed by the display device 10 from the input data that is input from the data input unit 30. For this reason, the display data may be equivalent to the input data or a part of the input data. For example, the display data may be the vehicle speed, at least one item of vehicle-related information, the driving environment information, or the occupant status information or a message derived from the occupant status information. However, it is not necessary to display all the items of display data.

The image data acquisition unit 22 obtains the image data captured by the front camera 35. The image data may consist of still images or moving images (video data). The front camera 35 repeatedly sends the image data to the image data acquisition unit 22. Alternatively, the front camera 35 may send the image data when requested by the image data acquisition unit 22.

The display image generator 24 generates contents of data based on the display data obtained by the display data acquisition unit 21, and lays out the contents of data to generate the display image to be displayed by the display device 10. For example, when the vehicle speed or vehicle-related information is to be displayed a numerical value, a character, or a predetermined icon that indicates information expressed by figures or patterns is generated as contents of data. When the driving environment information is to be displayed, for example, a tracking mark indicating that the vehicle is tracking the preceding vehicle, an icon of the traffic lane, a character or icon indicating that the vehicle may be running off the traffic lane, a character or icon that calls attention to the occupant of the vehicle, a character or icon that prompts the occupant of the vehicle to press down the brake pedal, a character or icon indicating that anti-collision braking has been performed, a character or icon that prompts the occupant of the vehicle to hold the steering wheel, a character or icon that provides notification that the preceding vehicle is driving off is generated as contents of data based on the distance information detected by various kinds of sensors such as a light detection and ranging (LiDAR) device and a camera. When the occupant status information is to be displayed, for example, a message saying "Stop driving right now" or "Take a break" is generated as contents of data.

The evaluation image generator 23 obtains the display image generated by the display image generator 24 and generates the evaluation image data by combining the obtained display image with the image data.

The evaluation unit 25 generates a saliency map of the evaluation image data. The contents of data to be highlighted and the contents of data to be inhibited are determined in a clear manner based on the status of the vehicle. When there are contents of data to be highlighted, the evaluation unit 25 sends the degree of highlighting, which is determined according to a difference between the evaluation value (representative value) of the contents of data to be highlighted and the evaluation value (representative value) of the background image, to the display image generator 24. When there are contents of data to be inhibited, the evaluation unit 25 sends the degree of inhibition, which is determined according to the difference between the evaluation value (representative value) of the contents of data to be inhibited and the evaluation value (representative value) of the background image, to the display image generator 24. The term "representative value" may indicate, for example, a maximum value, average value, or a median value of the contents of data or the background image. What is to be regarded as the background image may selectively be determined. For example, the preceding vehicle may be included as the background image when the weather is bad, or the preceding vehicle may be included as the background image in the nighttime. Alternatively, the occupant of the vehicle may determine what is to be regarded as the background image.

The display image generator 24 determines the way of presenting the contents of data (i.e., the display mode of the contents of data) based on the degree of highlighting or the degree of inhibition, and generates a display image. As the evaluation and the generation of a display image are performed in a repeated manner, the display image generator 24 can generate a display image in which the difference between the evaluation value (representative value) of the contents of data to be highlighted or inhibited and the evaluation value (representative value) of the background image satisfies the reference value of visual recognizability.

In order to highlight the image of contents of data, for example, the size or thickness of text or character may be increased, or the brightness may be enhanced. Moreover, the color of the background of the image of contents of data may be changed to the complementary color of the color of the image of contents of data, or the level of color saturation may be increased. Moreover, the distance to a virtual image may be increased, or the image of the contents of data may be flashed. Further, the position at which the image of contents of data is displayed may be changed, or the timing at which the image of contents of data is displayed may be adjusted. The image of the contents of data may be inhibited by performing the above operations in the reversed manner.

The image display unit 26 controls the LD driver 207 and the MEMS controller 208 to instruct the display device 10 to display a display image.

In the configuration as illustrated in FIG. 7, the display device 10 is instructed by the image display unit 26 to display the display image generated by the display image generator 24. However, no limitation is indicated thereby. Alternatively, the display image generated by the display image generator 24 may be sent only to the evaluation image generator 23, and the display image may be sent from the evaluation unit 25 to the image display unit 26. In such an alternative case, the evaluation unit 25 sends a display image that satisfies certain criteria for highlighting or inhibition to the image display unit 26. Due to such a configuration, only the display image in which the image of contents of data is appropriately highlighted or inhibited can be displayed.

Some example display images according to the present embodiment are described below with reference to FIG. 8A, FIG. 8B, FIG. 8C, FIG. 8D, FIG. 8E, and FIG. 8F. FIG. 8A, FIG. 8B, FIG. 8C, FIG. 8D, FIG. 8E, and FIG. 8F are diagrams each illustrating a different display image displayed by the display device 10, according to the present embodiment.

Figure 8A:
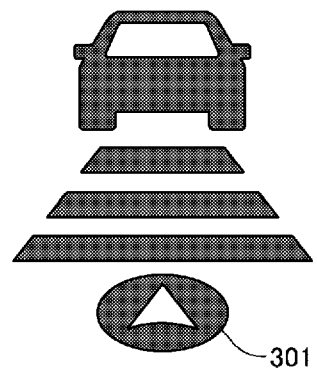

Firstly, FIG. 8A is an image including a tracking mark 301 that indicates that the vehicle is tracking a preceding vehicle, as an example display image indicative of the status of various kinds of controls based on the information detected by various kinds of sensors such as a light detection and ranging (LiDAR) device and a camera, according to the present embodiment. The tracking mark 301 that points at the preceding vehicle indicates the controlling processes to track the preceding vehicle are in operation.

FIG. 8B is an image including a pair of icons 302 indicative of the traffic lane and a character or icon indicating that the vehicle may be running off the traffic lane, according to the present embodiment. In order to show concern that the vehicle may be running off the traffic lane is indicated, an icon 303a indicative of the vehicle is inclined with reference to the pair of icons 302 indicative of the traffic lane and a message 303b saying "Watch the line" is displayed.

Figure 8C:
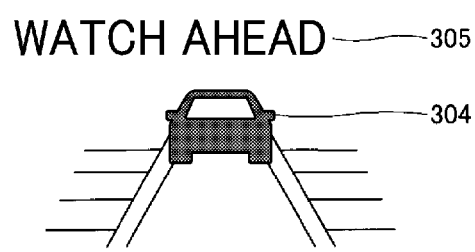

FIG. 8C is an image including a character and some icons that call attention to the occupant of the vehicle based on the time to collision (TTC) with an object, according to the present embodiment. More specifically, the image of FIG. 8C indicates that attention should be paid to the distance to the object by an icon 304 of a preceding vehicle and a message 305 saying "watch ahead."

Figure 8D:
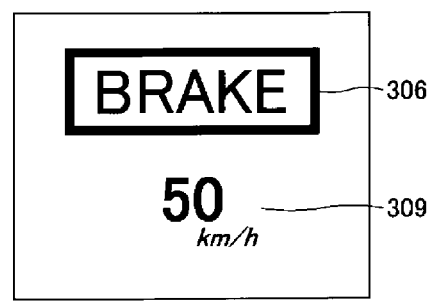

FIG. 8D is an image including a character or icon that prompts the occupant of the vehicle to press down the brake pedal, according to the present embodiment. More specifically, a message 306 saying "BRAKE" indicates that the brake pedal should be pressed down.

Figure 8E:
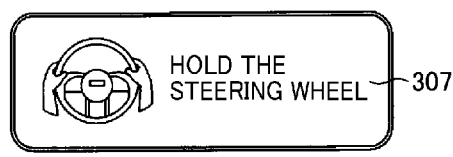

FIG. 8E is an image including texts (characters) and an icon that prompt the occupant of the vehicle to hold the steering wheel, according to the present embodiment. More specifically, a message 307 saying "Hold the steering wheel" prompts the occupant of the vehicle to hold the steering wheel.

Figure 8F:
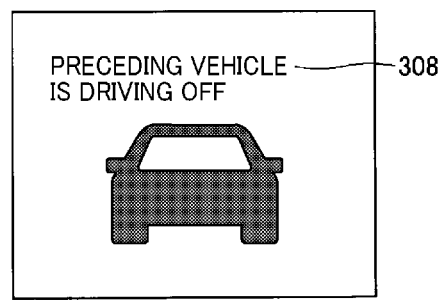

FIG. 8F is an image including texts (characters) and an icon that provides notification that the preceding vehicle is driving off, according to the present embodiment. More specifically, a message 308 saying "Preceding vehicle is driving off" indicates that the preceding vehicle is driving off.

The display image generator 24 changes the way of presenting these display images (i.e., the display mode of these display images) based on the degree of highlighting or the degree of inhibition sent from the evaluation unit 25. Note also that any one of the display images may flash or move like animation. For example, a moving pedestrian or the approaching direction of another vehicle may be indicated by animation, or the white lines may be flashed or blinked. Alternatively, in some cases, an alarm may ring where appropriate. Note also that any of the display images may be a still image or moving images.

Next, the superimposition of the display image generated by the display image generator 24 on the image data of the background image captured by the front camera 35 (i.e., the generation of an evaluation image data) is described with reference to FIG. 9, FIG. 10A, FIG. 10B, and FIG. 10C.

Figure 9:
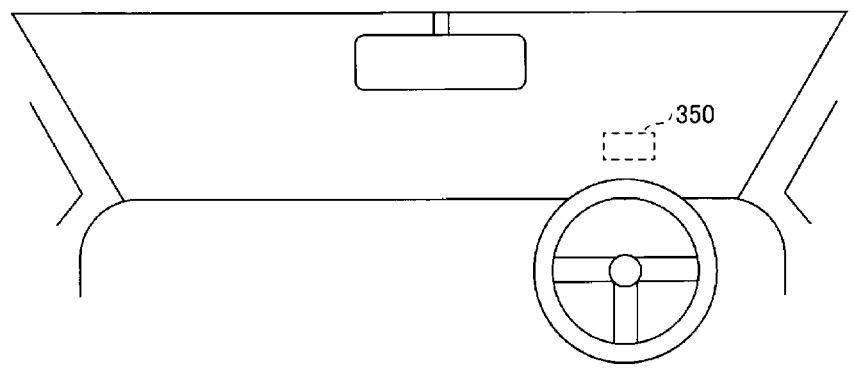
FIG. 9 is a diagram illustrating the projection area of a display image when viewed from the driver's seat, according to an embodiment of the present disclosure.

FIG. 9 is a diagram illustrating a projection area 350 of a display image when viewed from the driver's seat, according to the present embodiment. As the display image is reflected by the projection area 350 towards the occupant of the vehicle, the virtual image of the display image is superimposed on the background image when viewed from the driver's seat.

Figure 10A:
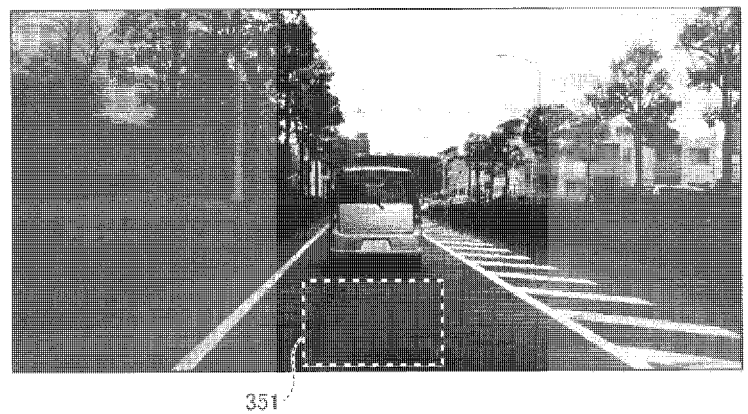
FIG. 10A, FIG. 10B, and FIG. 10C are diagrams illustrating how a display image is superimposed on the background image data, according to an embodiment of the present disclosure.
Figure 10B:
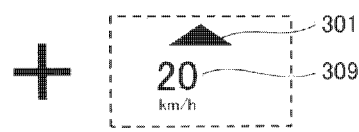
Figure 10C:
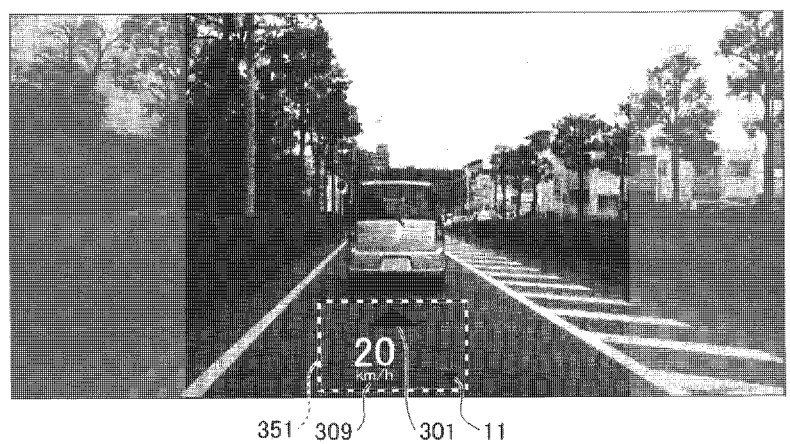

FIG. 10A, FIG. 10B, and FIG. 10C are diagrams illustrating how a display image is superposed on the background image data, according to the present embodiment. FIG. 10A is an image indicating the image data of the background image captured by the front camera 35, according to the present embodiment. FIG. 10B is an image including a display image generated by the display image generator 24, according to the present embodiment.

The evaluation image generator 23 superimposes a display image at the same position as the virtual image viewed from the eyepoint of the occupant of the vehicle. Although the position at which the virtual image appears slightly differs depending on the figure of the occupant of the vehicle, the position does not significantly vary. When the front camera 35 is fixed inside the vehicle, an area 351 in the image data that corresponds to the position at which the virtual image appears also does not significantly vary. For this reason, the evaluation image generator 23 can superimpose a display image on the area 351 fixed in the background image data.

FIG. 10C is an image of the evaluation image data according to the present embodiment. Two items of contents of data including the tracking mark 301 and the vehicle speed 309 are superimposed on the area 351. When the size of the area 351 is different from the size of the display image the size of the display image may be increased or reduced to fit the size of the area 351. Typically, the display image that is generated by the display image generator 24 is magnified to the size of the virtual image I. In other words, the display image generator 24 generates a display image smaller than the area 351, and in most cases, the display image generated by the display image generator is magnified.

In the present embodiment, it is assumed that a saliency map is generated using a method known in the art. The evaluation unit 25 converts the evaluation image data into a saliency map, or generates a saliency map based on the evaluation image data. Note also that, even when the background image is completely the same, the saliency map varies between when the saliency map is generated based only on the background image data and when the saliency map is generated based on the evaluation image data on which a display image is superimposed.

It is assumed that a saliency map may be generated based on a method disclosed in NPL 1 or NPL 2, or other various kinds of methods known in the art. For example, a saliency map is generated based on at least one of brightness, complementary colors, saturation, and distance information included in the image data (i.e., the depth information of the image data). The saliency map has an evaluation value for visual recognizability on a pixel-by-pixel basis. The distance information included in the image data may be the distance captured by a stereo camera or the distance measured by a laser.

Note also that the saliency map may be generated using the information about the occupant of the vehicle. The information about the occupant of the vehicle includes, for example, gender, age, eyesight, the level of fatigue, and race. The degree of fatigue is estimated from the occupant status information. Gender, age, eyesight, and race may be input by the occupant of the vehicle, or may be determined by a vehicle-installed device based on the external appearance.

Figure 11:
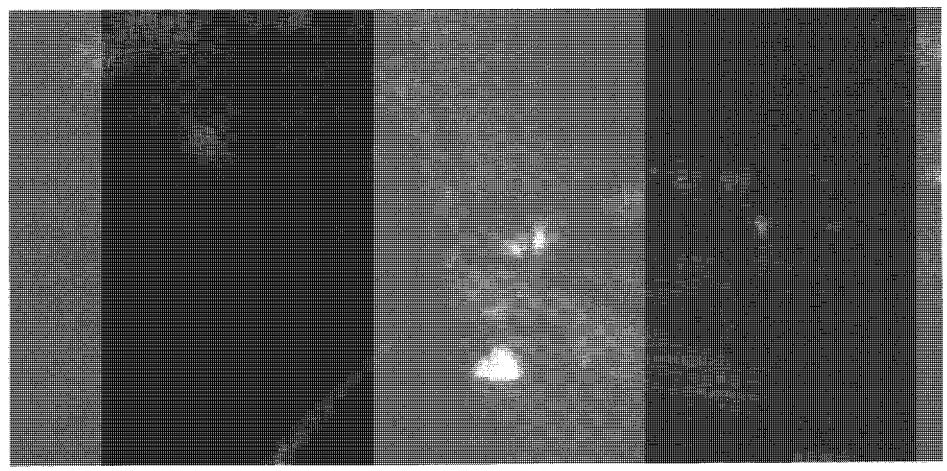
FIG. 11 is a saliency map generated from the evaluation image data of FIG. 10C.

FIG. 11 is a saliency map generated from the evaluation image data of FIG. 10C. The visual recognizability of the image is expressed by levels of gradation (levels of brightness). A brighter pixel indicates a higher evaluation value and higher energy, and this indicates a higher level of visual recognizability. A darker pixel indicates a lower evaluation value and lower energy, and this indicates a lower level of visual recognizability. In the saliency map of FIG. 11, it is understood that the evaluation value of the tracking mark 301 is higher than the other contents of data between the two items of contents of data as illustrated in FIG. 10C.

Figure 12:
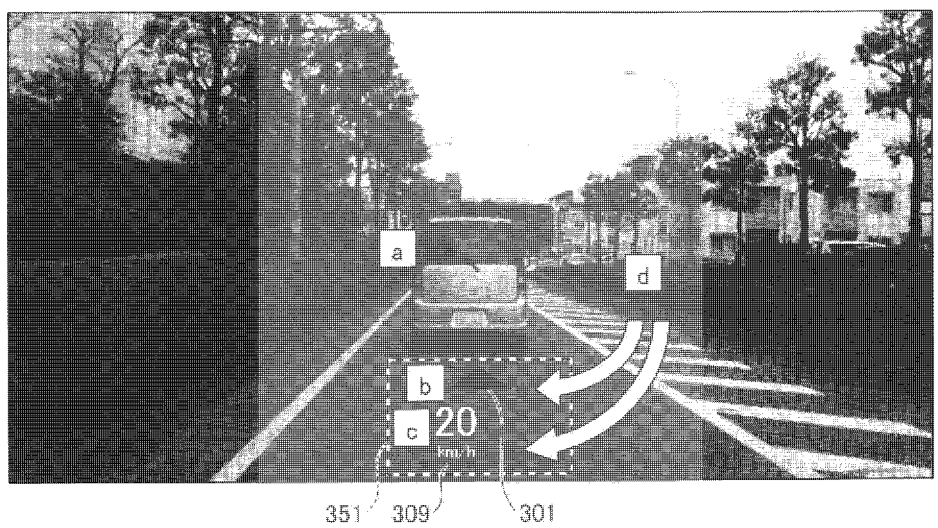
FIG. 12 is a diagram illustrating evaluation image data according to an embodiment of the present disclosure.

How the images of contents of data are highlighted or inhibited are described below with reference to FIG. 12. FIG. 12 is an image of evaluation image data, which is similar to that of FIG. 10C, where labels "a" to "d" are given so as to be compared with the saliency map of FIG. 13 as will be described later. Each label indicates the following items.

Label a: Preceding Vehicle
Label b: Tracking Mark (Contents of Data)
Label c: Vehicle Speed (Contents of Data)
Label d: Other Background Images The label "a" indicates a preceding vehicle to which the occupant of the vehicle typically pays attention. For this reason, preferably, the object that is indicated by the label "a" has a relatively high evaluation value. When the projection area 350 of a display image is large, for example, the color of the preceding vehicle can be changed by performing image processing. In other words, the image of the preceding vehicle may be processed to implement augmented reality (AR). The label "b" indicates a tracking mark, and the importance of the tracking mark is not relatively high under normal conditions. However, when the mode of the tracking mark changes to a warning mode or the like according to the following distance, it is desired that the tracking mark have a high evaluation value. The display system 1 according to the present embodiment can highlight the tracking mark 301 (contents of data).

The label c indicates the speed of the vehicle of the occupant. For example, when the tracking mark is being displayed, the importance of the vehicle speed (contents of data) is relatively low. In other words, the occupant of the vehicle does not have to keep watching depending on the control state of the vehicle. In the present embodiment, the tracking mark 301 (contents of data) is highlighted, and the vehicle speed 309 (contents of data) can be inhibited so as not to arouse an attention of the occupant of the vehicle.

Cases in which the tracking mark 301 indicated by the label "b" is to be highlighted are described below. When the representative value of the tracking mark 301 indicated by the label "b" is larger than the representative value of the background image indicated by the label "d," it is considered that the occupant of the vehicle moves his or her line of sight to the tracking mark 301 with greater stimulative properties and characteristics and pays attention to the tracking mark 301. Accordingly, the display image generator 24 highlights the tracking mark 301 (contents of data).

The background image can be extracted in a selective manner. The preceding vehicle that is indicated by the label "a" may be regarded as a part of the background image indicated by the label "d," or may be excluded from the background image. The vehicle speed 309 that is indicated by the label "c" may be regarded as a part of the background image indicated by the label "d," or may be excluded from the background image. In view of the above, the combinations in comparison are as follows.

(i) Comparison between all the representative values of label "a," label "c," and label "d" and the representative value of label "b" (i.e. the tracking mark 301)

(ii) Comparison between the representative values of label "a" and label "d" and the representative value of label "b" (i.e., the tracking mark 301)

(iii) Comparison between the representative values of label "c" and label "d" and the representative value of label "b" (i.e., the tracking mark 301)

(iv) Comparison between the representative values of label "d" and the representative value of label "b" (i.e., the tracking mark 301)

In (i), the image of label "b" can be highlighted with respect to all the fields of view of the occupant of the vehicle. In (ii), the label "c" is excluded, and thus the image of label "b" (i.e., the tracking mark 301) can be highlighted regardless of the image of label "c."

In (iii), the label "a" is excluded, and thus the image of label "b" (i.e., the tracking mark 301) can be highlighted regardless of the preceding vehicle. In other words, the image of label "b" (i.e., the tracking mark 301) can be highlighted while maintaining the preceding vehicle as a target to be observed. In (iv), the labels "a" and "c" are excluded, and thus the image of label "b" (i.e., the tracking mark 301) can be highlighted with respect to only the background image.

Cases in which the vehicle speed 309 indicated by the label "c" is to be inhibited are described below. When the representative value of the vehicle speed 309 indicated by the label "c" is smaller than the representative value of the background image indicated by the label "d," it is considered that the occupant of the vehicle who is viewing the background image does not have to pay attention to the vehicle speed 309 indicated by the label "c" while driving the vehicle. Accordingly, the display image generator 24 inhibits the vehicle speed 309 (contents of data).

The background image can be extracted in a selective manner. The preceding vehicle that is indicated by the label "a" may be regarded as a part of the background image indicated by the label "d," or may be excluded from the background image. The tracking mark 301 that is indicated by the label "b" may be included in the background image indicated by the label "d," or may be excluded from the background image. In view of the above, the combinations in comparison are as follows.

(i) Comparison between all the representative values of the images indicated by label "a," label "b," and label "d" and the representative value of the image indicated by label "c" (i.e. the vehicle speed 309)

(ii) Comparison between the representative values of the images indicated by label "a" and label "d" and the representative value of the image indicated by label "c" (i.e. the vehicle speed 309)

(iii) Comparison between the representative values of the images indicated by label "b" and label "d" and the representative value of the image indicated by label "c" (i.e. the vehicle speed 309)

(iv) Comparison between the representative value of the image indicated by label "d" and the representative value of the image indicated by label "c" (i.e. the vehicle speed 309)

The functions of the comparisons in (i) to (iv) are similar to those of the cases of highlighting. As described above, in the present embodiment, any desired image of contents of data to be displayed by the display device 10 can be highlighted or inhibited with respect to "the background image," "the background image and the preceding vehicle," "the background image and the images of other contents of data," or "the background image, the preceding vehicle, and the images of other contents of data". In other words, the display mode of at least one item of contents of data in the image data and the display data obtained by image data acquisition unit 22 can be changed such that the visual recognizability of a desired item of contents of data included in the display image is increased to a level at least more than the visual recognizability of an area not including the desired item of contents of data.

The area that does not include the image of a desired item of contents of data (for example, the vehicle speed) includes at least some of the image data and the display image, and the area that does not include the image of the desired item of contents of data includes another item of contents of data (for example, a mark) included in the image data and the display image.

In the following description, "the background image," "the background image and the preceding vehicle," "the background image and the images of other contents of data," or "the background image, the preceding vehicle, and the images of other contents of data" are referred to simply as "the background image or the like."

As described above, the background image can selectively be extracted according to the present embodiment.

Figure 13:
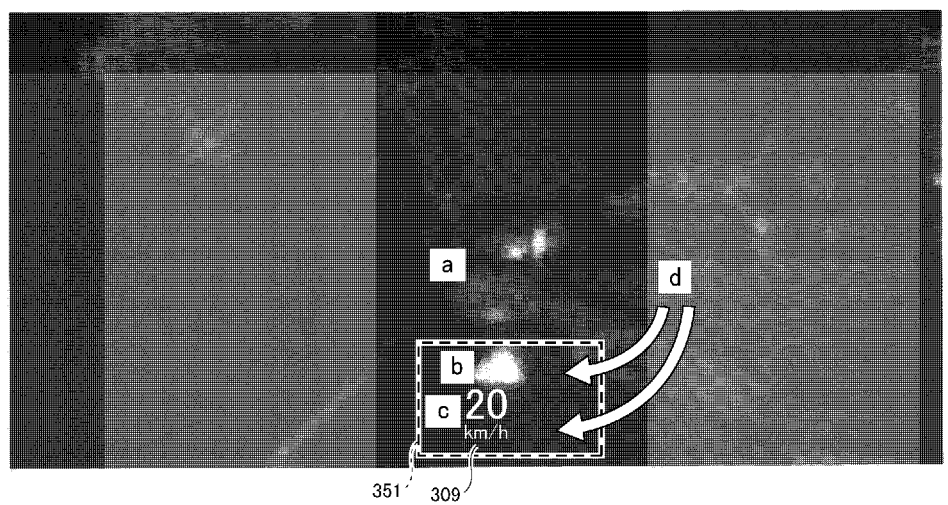
FIG. 13 is a saliency map of the evaluation image data of FIG. 12.

FIG. 13 is a saliency map of the evaluation image data of FIG. 12. The labels "a" to "d" in FIG. 13 are equivalent to the labels "a" to "d" in FIG. 12. The levels of gradation on the right side of the label "a" indicates the visual recognizability of the preceding vehicle, and the levels of gradation on the right side of the label "b" indicates the visual recognizability of the tracking mark 301. Moreover, the levels of gradation on the right side of the label "c" indicates the visual recognizability of the vehicle speed 309. Further, the label "d" indicates the background image excluding the areas indicated by the labels "a" to "c," and the levels of gradation in the entirety of the saliency map indicates the visual recognizability of the background image.

Firstly, cases in which the tracking mark 301 indicated by the label "b" is to stand out more than the background image indicated by the label "d" are considered in view of (iv). Eventually, the evaluation value (brightness) of the tracking mark 301 is greater (brighter) than the evaluation value of the background image indicated by the label "d."

Accordingly, it is determined by the evaluation unit 25 that the tracking mark 301 meets the desired level with reference to the background image and thus is highlighted. As a concrete example of evaluation method, the representative value of the tracking mark 301 (contents of data) to be highlighted in the display is compared with the representative value of the background image, and the difference between the representative value of the tracking mark 301 and the representative value of the background image is calculated. The display image generator 24 changes the way of presenting the tracking mark 301 (contents of data) such that the calculated difference is equal to or greater than a predetermined threshold indicating the degree of highlighting.

Secondly, in a similar manner, cases in which the vehicle speed 309 that is indicated by the label "c" is not to stand out as much as the background image indicated by the label "d" are considered in view of (iv). Eventually, the evaluation value (brightness) of the vehicle speed 309 is less (darker) than the evaluation value of the background image indicated by the label "d."

Accordingly, it is determined by the evaluation unit 25 that the vehicle speed 309 meets the desired level with reference to the background image and thus is inhibited. As a concrete example of evaluation method, the vehicle speed 309 (contents of data) to be inhibited in the display is compared with the representative value of the background image, and the difference between the vehicle speed 309 (contents of data) to be inhibited in the display is and the representative value of the background image is calculated. The display image generator 24 changes the way of presenting the vehicle speed 309 (contents of data) such that the calculated difference is equal to or greater than a predetermined threshold indicating the degree of inhibition.

When the images that are indicated by the labels "a," "c," and "d" are regarded as the background image and the tracking mark 301 that is indicated by the label "b" is to be highlighted as in (i) as above, the images that are indicated by the labels "a," "b," and "c" are included in the background image, and attention is to be focused on the representative value. When the images that are indicated by the labels "a," "b," and "d" are regarded as the background image and the vehicle speed 309 that is indicated by the label "c" is to be inhibited, the images that are indicated by the labels "a," "b," and "d" are included in the background image, and attention is to be focused on the representative value. The same applies to the cases of (ii) and (iii) as above.

Quantitative adjustment of how each image of contents of data is highlighted or inhibited is described below with reference to FIG. 14A, FIG. 14B, FIG. 14C, FIG. 14D, FIG. 15A, FIG. 15B, FIG. 15C, and FIG. 15D. In the present embodiment, the degree of modification (highlighting or inhibition) is determined such that the difference between the first evaluation value indicative of the visual recognizability of a desired item of contents of data that are included in the display image and the second evaluation value indicative of the visual recognizability of the image data and at least some of the display image becomes equal to or greater than a predetermined threshold.

Figure 14A:
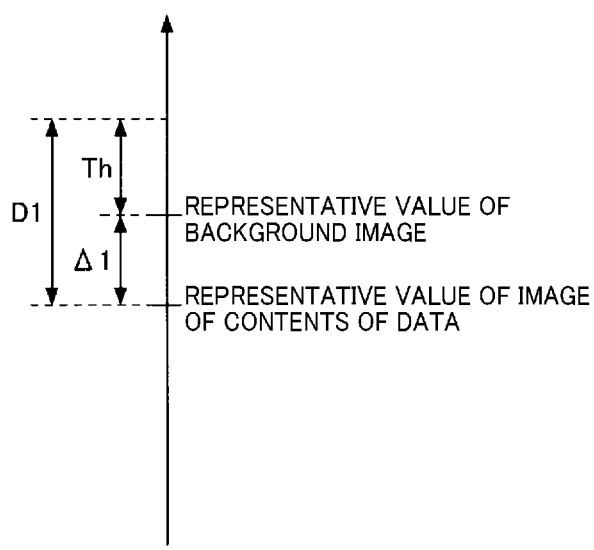
FIG. 14A, FIG. 14B, FIG. 14C, and FIG. 14D are diagrams illustrating a method of determining the degree of highlighting when the image of contents of data is highlighted, according to an embodiment of the present disclosure.

FIG. 14A, FIG. 14B, FIG. 14C, and FIG. 14D are diagrams illustrating a method of determining the degree of highlighting when the image of contents of data is to be highlighted, according to the present embodiment. FIG. 14A illustrates the order of size between the representative value of the background image or the like and the representative value of the image of contents of data, any of which is not-yet highlighted. Firstly, it is desired that the representative value of the image of contents of data (an example of the first evaluation value) be higher than the representative value of the background image or the like (an example of the second evaluation value) by a threshold Th. In other words, the desired level of visual recognizability is satisfied when the representative value of the image of contents of data is larger than the representative value of the background image or the like by the threshold Th.

When it is assumed that the difference between the representative value of the background image or the like and the representative value of the image of contents of data is Δ1, the degree of highlighting D1 that is used to obtain a representative value that satisfies the desired level is calculated by the following equation. D1=Threshold Th+Difference Δ1

Figure 14B:
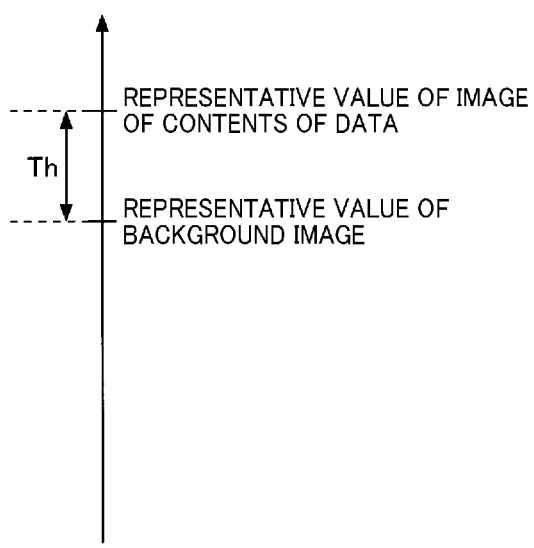

FIG. 14B illustrates the order of size between the representative value of the background image or the like and the representative value of the image of contents of data when the image of contents of data is highlighted by the degree of highlighting D1. As illustrated in FIG. 14B, the representative value of the image of contents of data is obtained that is larger than the representative value of the background image or the like by the threshold Th.

Figure 14C:
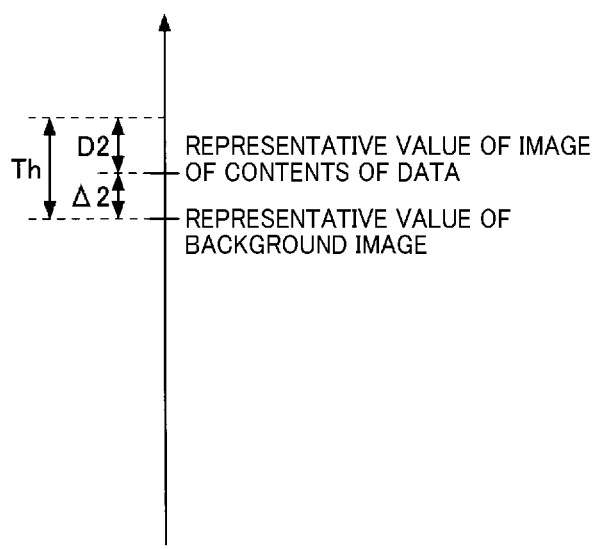

As illustrated in FIG. 14C, when the representative value of the image of contents of data is higher than the representative value of the background image or the like but the desired degree of difference is not satisfied, adjustment is performed as follows. In such a case, the degree of highlighting D2 that is used to obtain a representative value that satisfies the desired level is calculated by the following equation. D2=Threshold Th−Difference Δ2

As described above, the degrees of highlighting D1 and D2 can appropriately be determined depending on whether the representative value of the image of contents of data is higher or lower than the representative value of the background image or the like.

Figure 14D:
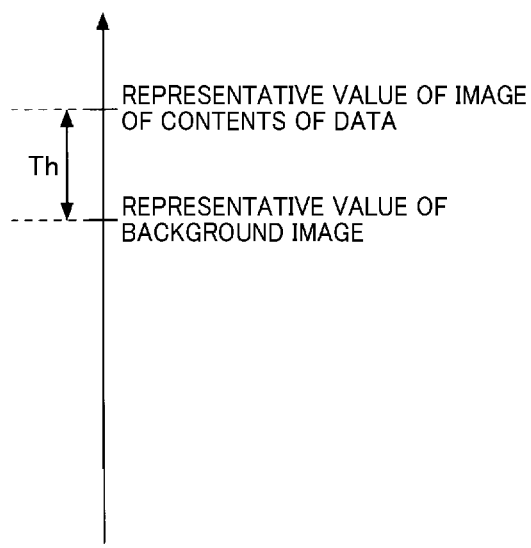

FIG. 14D illustrates the order of size between the representative value of the background image or the like and the representative value of the image of contents of data when the image of contents of data is highlighted by the degree of highlighting D2. As illustrated in FIG. 14D, the representative value of the image of contents of data is obtained that is larger than the representative value of the background image or the like by the threshold Th.

Figure 15A:
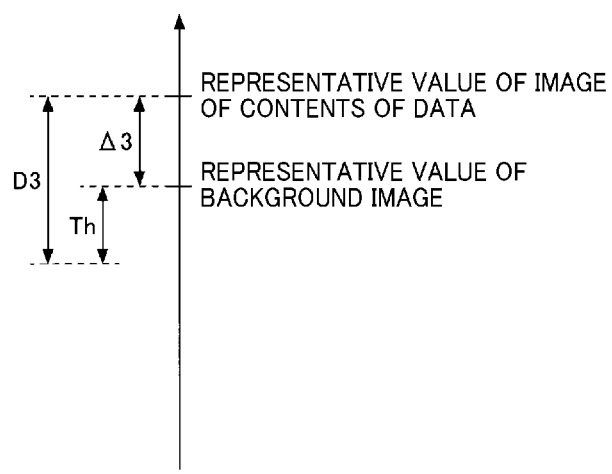
FIG. 15A, FIG. 15B, FIG. 15C, and FIG. 15D are diagrams illustrating a method of determining the degree of inhibition when the image of contents of data is inhibited, according to an embodiment of the present disclosure.

FIG. 15A, FIG. 15B, FIG. 15C, and FIG. 15D are diagrams illustrating a method of determining the degree of inhibition when the image of contents of data is to be inhibited, according to the present embodiment. FIG. 15A illustrates the order of size between the representative value of the background image or the like and the representative value of the image of contents of data, any of which is not-yet inhibited. Firstly, it is desired that the representative value of the image of contents of data be lower than the representative value of the background image or the like by a threshold Th. In other words, the desired level of low visual recognizability is satisfied when the representative value of the image of contents of data is smaller than the representative value of the background image or the like by the threshold Th.

When it is assumed that the difference between the representative value of the background image or the like and the representative value of the image of contents of data is Δ3, the degree of inhibition D3 that is used to obtain a representative value that satisfies the desired level is calculated by the following equation. D3=Threshold Th+Difference Δ3

Figure 15B:
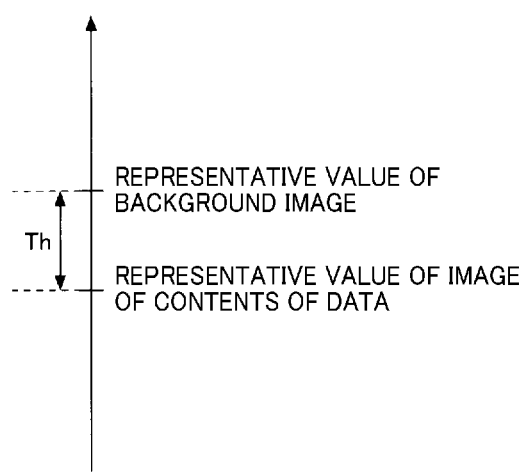

FIG. 15B illustrates the order of size between the representative value of the background image or the like and the representative value of the image of contents of data when the image of contents of data is inhibited by the degree of highlighting D3. As illustrated in FIG. 15B, the representative value of the image of contents of data is obtained that is smaller than the representative value of the background image or the like by the threshold Th.

Figure 15C:
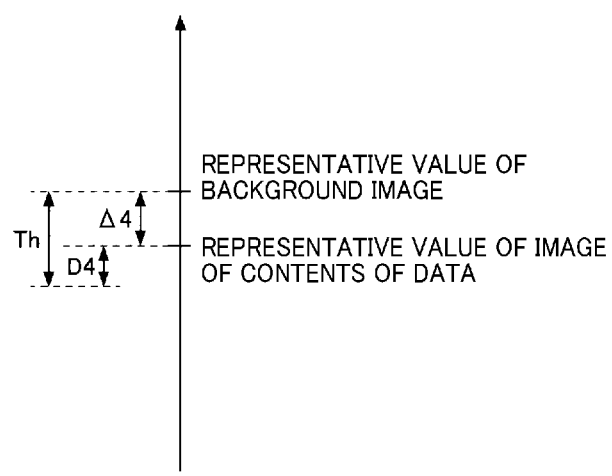

As illustrated in FIG. 15C, when the representative value of the image of contents of data is smaller than the representative value of the background image or the like but the desired degree of difference is not satisfied, adjustment is performed as follows. In such a case, the degree of inhibition D4 that is used to obtain a representative value that satisfies the desired level is calculated by the following equation. D4=Threshold Th−Difference Δ4

As described above, the degrees of inhibition D3 and D4 can appropriately be determined depending on whether the representative value of the image of contents of data is higher or lower than the representative value of the background image or the like.

Figure 15D:
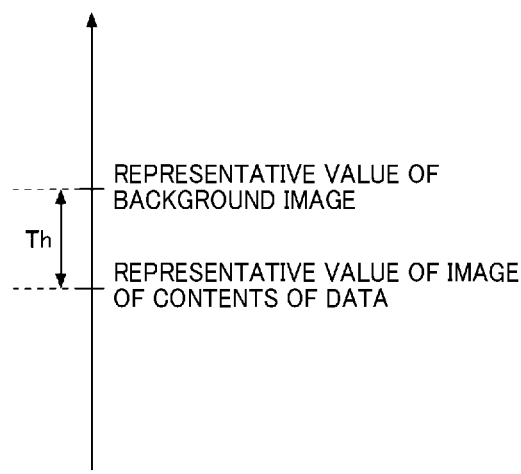

FIG. 15D illustrates the order of size between the representative value of the background image or the like and the representative value of the image of contents of data when the image of contents of data is inhibited by the degree of highlighting D4. As illustrated in FIG. 15D, the representative value of the image of contents of data is obtained that is smaller than the representative value of the background image or the like by the threshold Th.

As described above, the display system 1 according to the present embodiment can quantitatively adjust the highlighting and inhibition. The threshold Th that is used for highlighting may vary from the threshold Th used for inhibition. Alternatively, the threshold Th may vary for each item of the contents of data.

Figures 1, 16A:
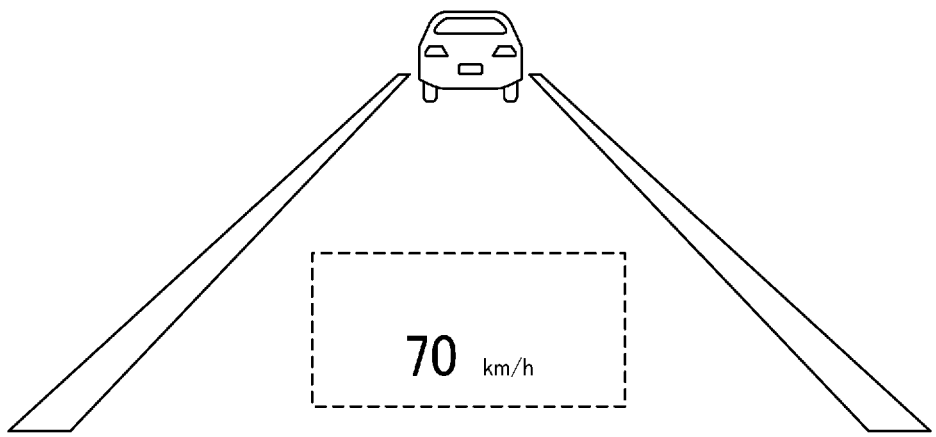
Figures 2, 16A:
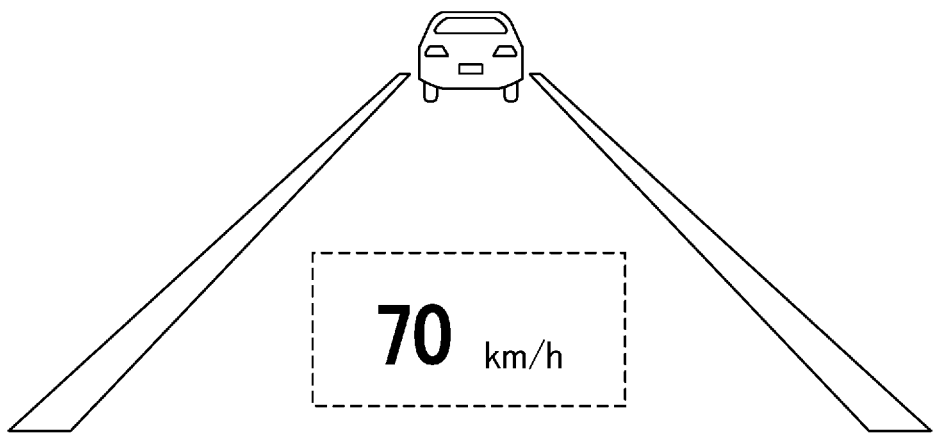

How the display mode is changed is described below with reference to FIG. 16A-1, FIG. 16A-2, FIG. 16B-1, FIG. 16B-2, FIG. 16C-1, FIG. 16C-2, FIG. 17A-1, FIG. 17A-2, FIG. 17B-1, FIG. 17B-2, FIG. 17C-1, FIG. 17C-2, FIG. 17D-1, and FIG. 17D-2. FIG. 16A-1, FIG. 16A-2, FIG. 16B-1, FIG. 16B-2, FIG. 16C-1, and FIG. 16C-2 are diagrams each illustrating a display mode where the size or thickness of text or character and the brightness are changed and complementary colors are used, according to the present embodiment. FIG. 16A-1 is a diagram illustrating the way of presenting a display image (i.e., the display mode of a display image) whose size and thickness are not-yet changed, according to the present embodiment. FIG. 16A-2 is a diagram illustrating the way of presenting a display image (i.e., the display mode of a display image) whose size and thickness are changed, according to the present embodiment. In FIG. 16A-2, the image of particular contents of data is highlighted by increasing the size and thickness of the vehicle speed (contents of data), compared with FIG. 16A-1. In FIG. 16A-1, the image of particular contents of data is inhibited, compared with FIG. 16A-2.

Figures 1, 16B:
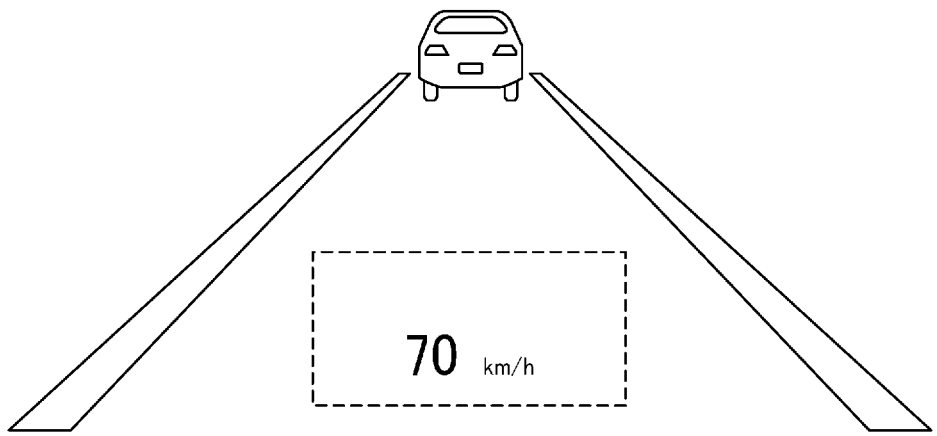
Figures 2, 16B:
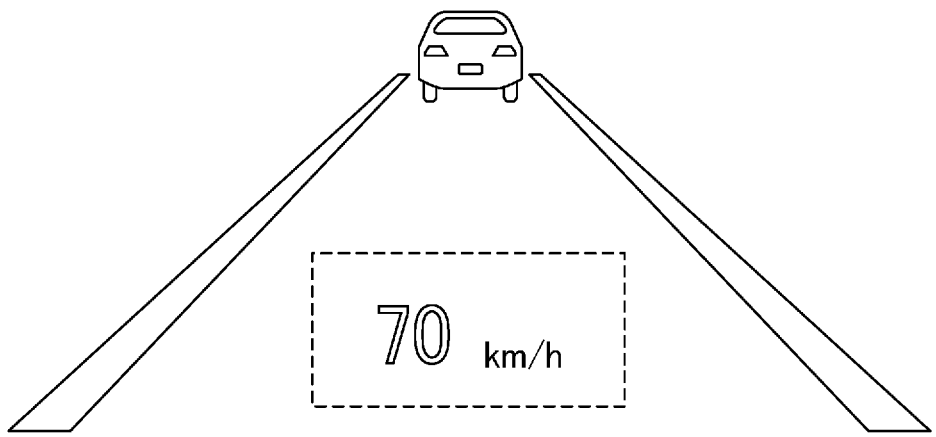

FIG. 16B-1 is a diagram illustrating the way of presenting a display image (i.e., the display mode of a display image) whose brightness is not-yet changed, according to the present embodiment. FIG. 16B-2 is a diagram illustrating the way of presenting a display image (i.e., the display mode of a display image) whose brightness is changed, according to the present embodiment. In FIG. 16B-2, the image of particular contents of data is highlighted by increasing the brightness of the vehicle speed (contents of data). In FIG. 16B-1, the image of particular contents of data is inhibited, compared with FIG. 16B-2.

Figures 1, 16C:
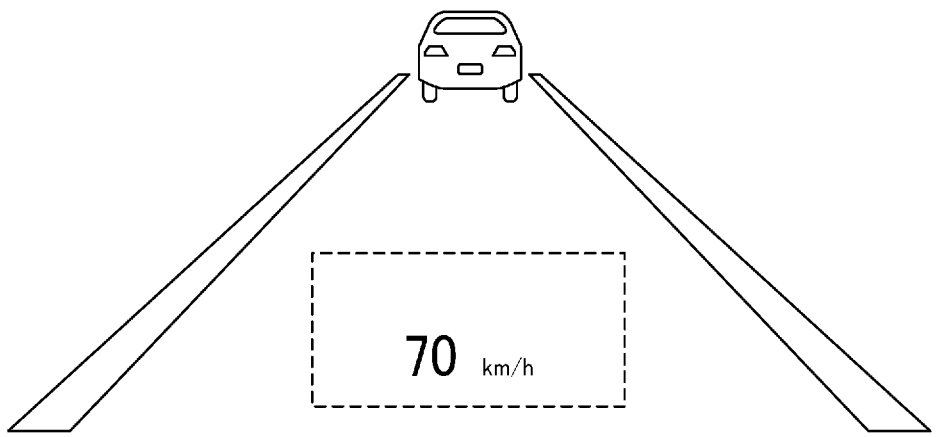
Figures 2, 16C:
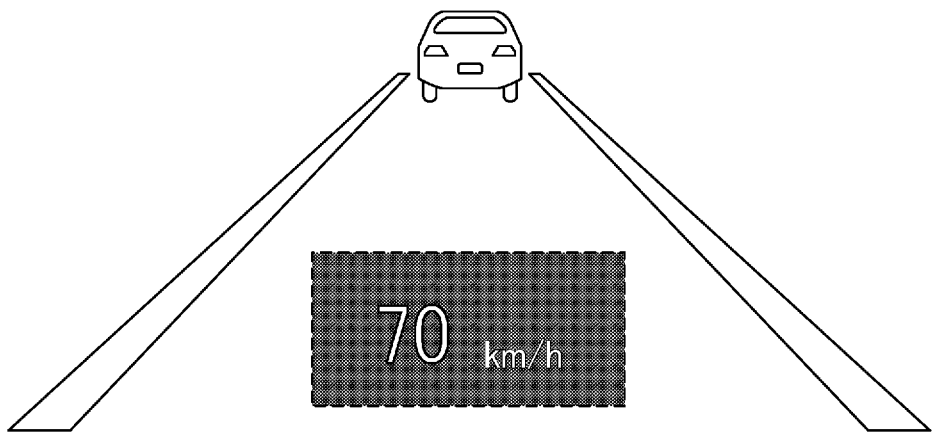

FIG. 16C-1 is a diagram illustrating the way of presenting a display image (i.e., the display mode of a display image) where some colors are not-yet changed to a pair of complementary colors, according to the present embodiment. FIG. 16C-2 is a diagram illustrating the way of presenting a display image (i.e., the display mode of a display image) where some colors are changed to a pair of complementary colors, according to the present embodiment. In FIG. 16C-2, the image of particular contents of data is highlighted as the color of the background image of the vehicle speed (contents of data) is complementary to the color of the vehicle speed (contents of data). In FIG. 16C-1, the image of particular contents of data is inhibited, compared with FIG. 16C-2. When a certain color is complementary to a different color, those colors are positioned diametrically opposite to each other in the color wheel, and one of such a pair of colors can make the other color stand out. For example, yellow is complementary to purple.

When the image of contents of data is to be highlighted, it is not always necessary to change the color of the background image. Instead, uniform color may be sought out from a part of the area closest to the image of contents of data whose dimension is equal to or greater than a predetermined dimension, and the image of contents of data may be displayed with the complementary color of the uniform color.

Figures 1, 17A:
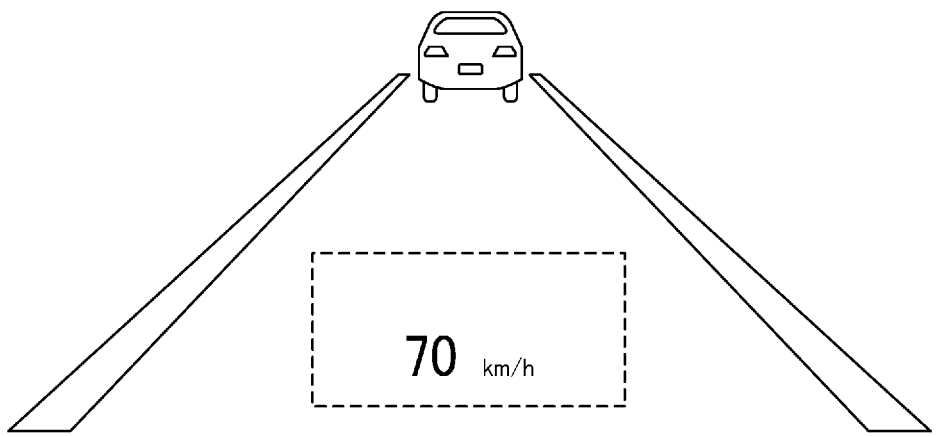
Figures 2, 17A:
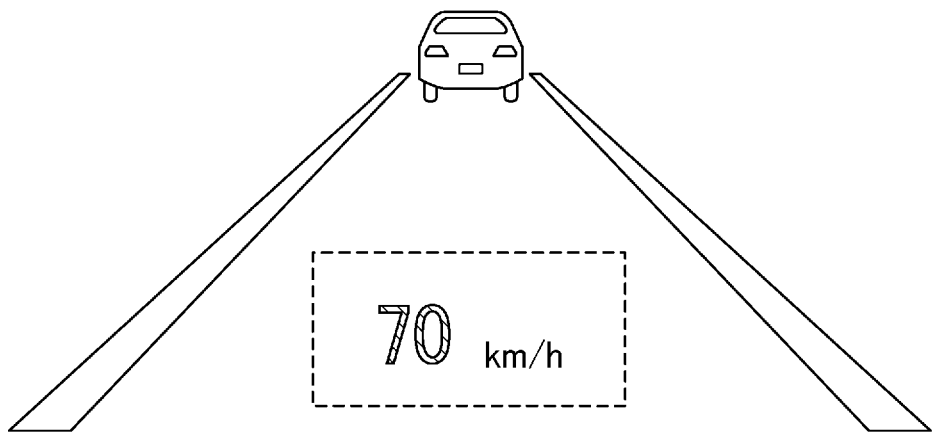

FIG. 17A-1, FIG. 17A-2, FIG. 17B-1, FIG. 17B-2, FIG. 17C-1, FIG. 17C-2, FIG. 17D-1, and FIG. 17D-2 are diagrams each illustrating a change in display mode where the level of color saturation, the distance to a virtual image, or the display position is changed, or flashing is used, according to the present embodiment. FIG. 17A-1 is a diagram illustrating the way of presenting a display image (i.e., the display mode of a display image) whose saturation is not-yet changed, according to the present embodiment. FIG. 17A-2 is a diagram illustrating the way of presenting a display image (i.e., the display mode of a display image) whose saturation is changed, according to the present embodiment. In FIG. 17A-2, the image of particular contents of data is highlighted by increasing the saturation of the vehicle speed (contents of data). In FIG. 17A-1, the image of particular contents of data is inhibited, compared with FIG. 17A-2.

Figures 1, 17B:
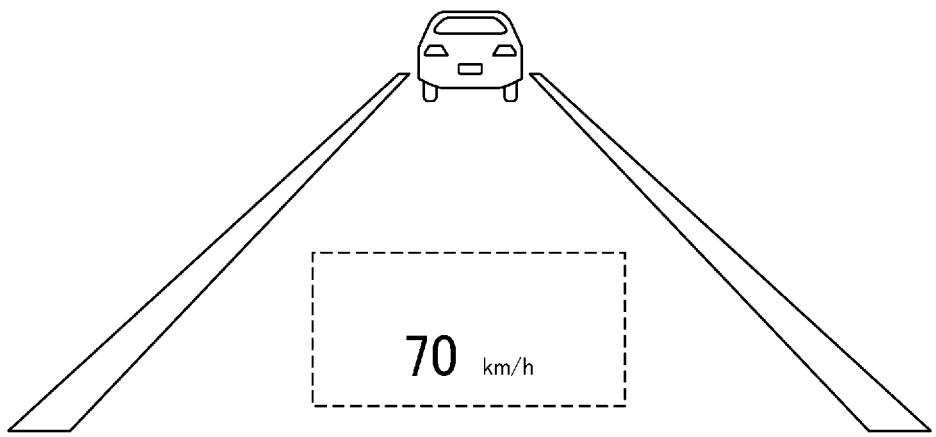
Figures 2, 17B:
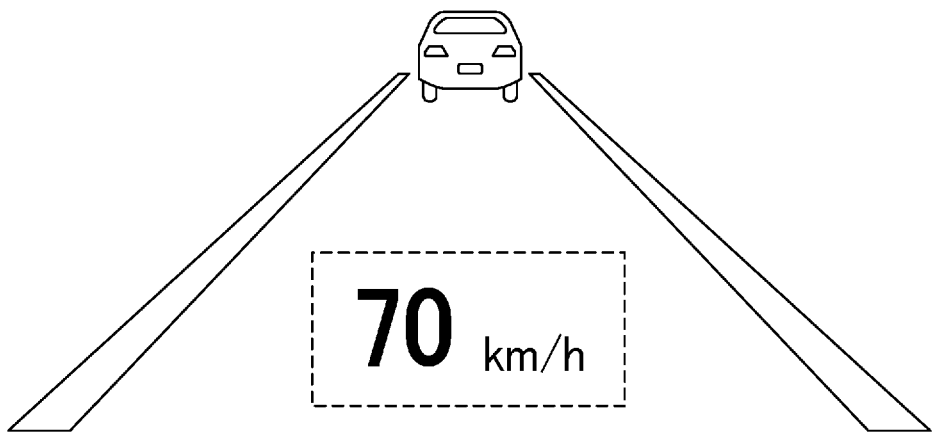

FIG. 17B-1 is a diagram illustrating the way of presenting a display image (i.e., the display mode of a display image) whose distance to the virtual image is not-yet changed, according to the present embodiment. FIG. 17B-2 is a diagram illustrating the way of presenting a display image (i.e., the display mode of a display image) whose distance to the virtual image is changed, according to the present embodiment. In FIG. 17B-2, the distance to the virtual image is lengthened, and thus the virtual image appears larger when viewed by the occupant of the vehicle. Accordingly, the image of particular contents of data is highlighted. In FIG. 17B-1, the image of particular contents of data is inhibited, compared with FIG. 17B-2. In order to increase the distance to the virtual image, the optical-path length from the concave minor 105 to the front windshield 91 may be increased. For example, the light may be turned several times as reflected by a plurality of minors.

Figures 1, 17C:
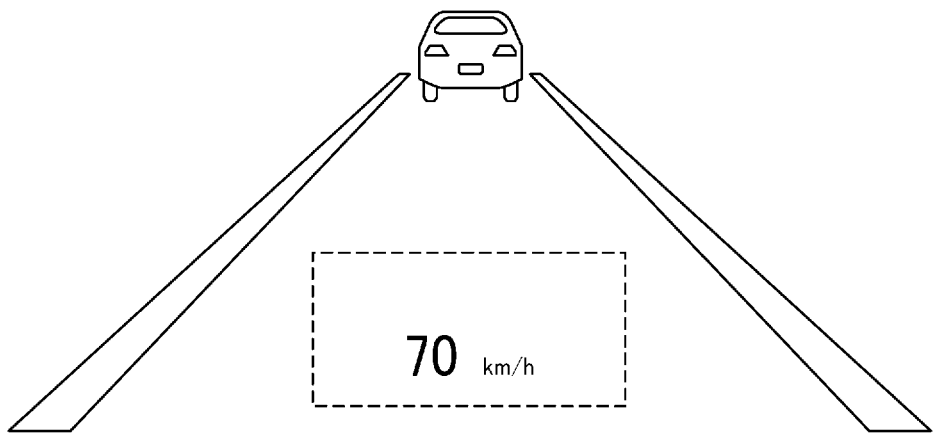
Figures 2, 17C:
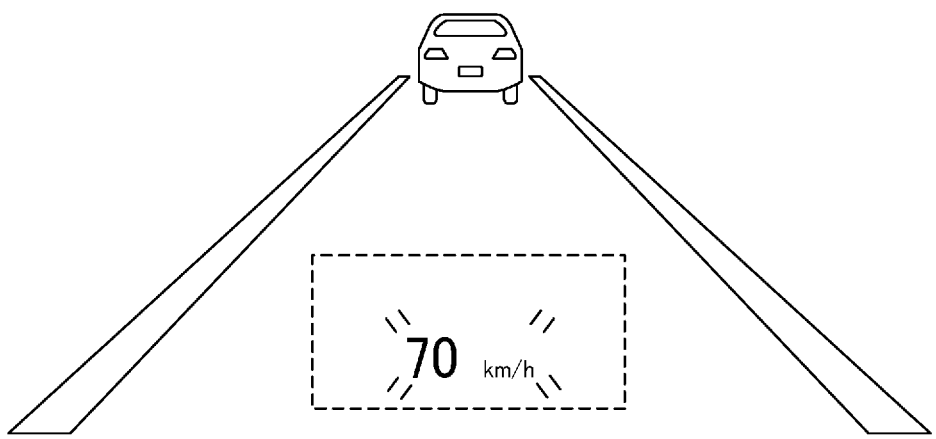

FIG. 17C-1 is a diagram illustrating the way of presenting a display image (i.e., the display mode of a display image) that is not-yet flashing, according to the present embodiment. FIG. 17C-2 is a diagram illustrating the way of presenting a display image (i.e., the display mode of a display image) that is flashing, according to the present embodiment. In FIG. 17C-2, the image of particular contents of data is highlighted as the display image is flashing. In FIG. 17C-1, the image of particular contents of data is inhibited, compared with FIG. 17C-2. The speed of flashing may be changed to achieve highlighting or inhibition in addition to or in place of the presence or absence of flashing.

Figures 1, 17D:
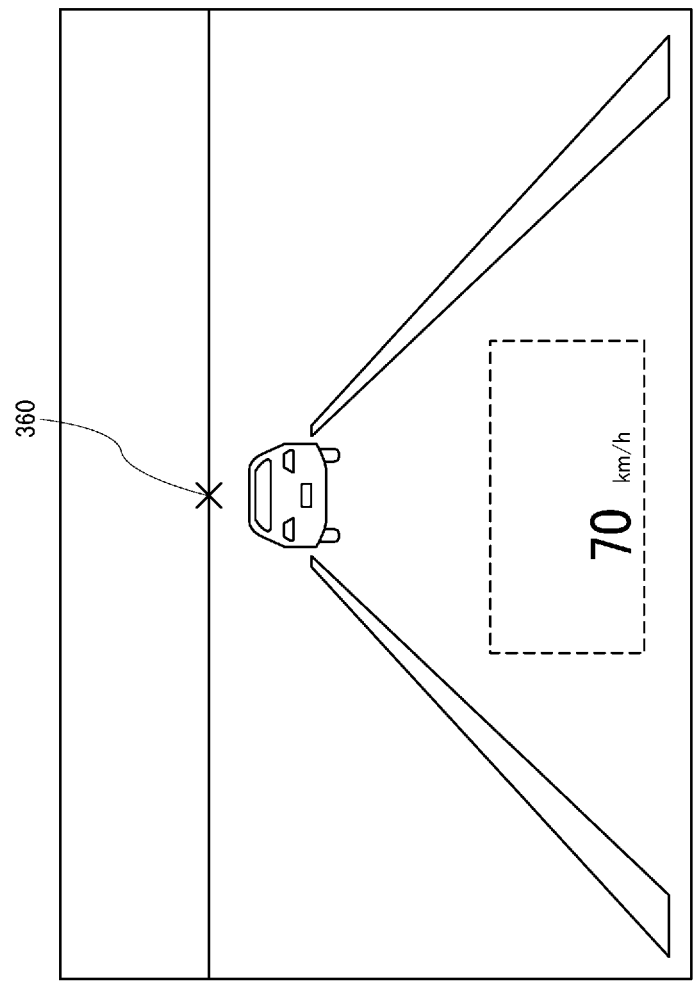
Figures 2, 17D:
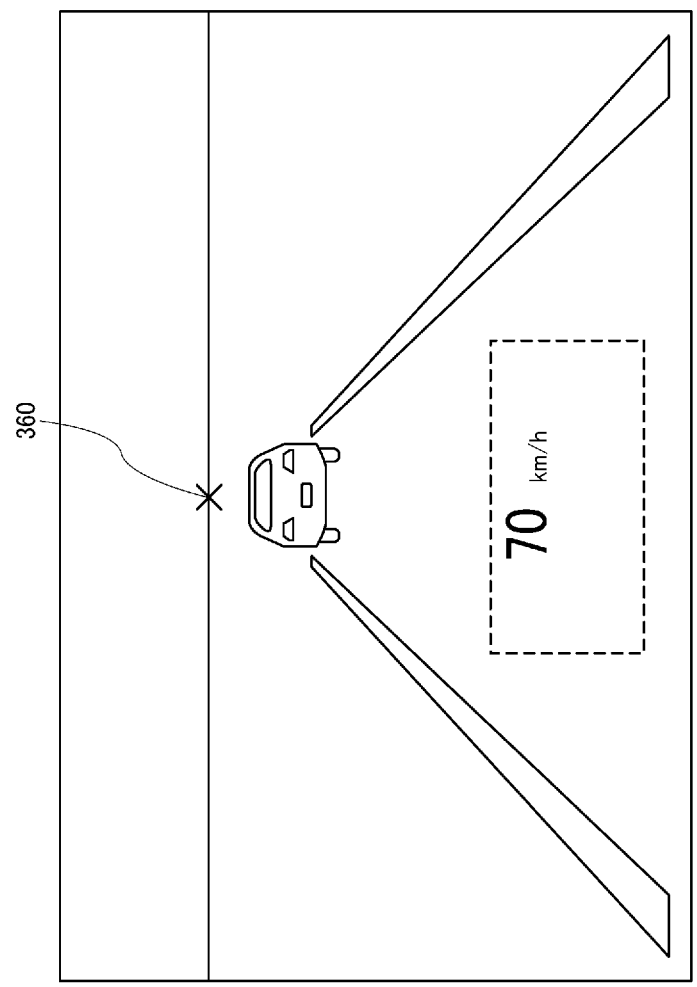

FIG. 17D-1 is a diagram illustrating the way of presenting a display image (i.e., the display mode of a display image) whose display position is not-yet changed, according to the present embodiment. FIG. 17D-2 is a diagram illustrating the way of presenting a display image (i.e., the display mode of a display image) whose display position is changed, according to the present embodiment. The occupant of the vehicle tends to drive the vehicle while focusing on a vanishing point 360. For this reason, an area close to the vanishing point 360 tends to have a high evaluation value. In other words, particular contents of data can be highlighted by displaying those contents of data at a display position close to the vanishing point 360. In FIG. 17D-2, the contents of data move towards the upper side of the projection area 350 and thus are displayed at a display position closer to the vanishing point 360. In FIG. 17D-1, the image of particular contents of data is inhibited, compared with FIG. 17D-2.

In addition to the changes in display mode as described above with reference to FIG. 16A-1, FIG. 16A-2, FIG. 16B-1, FIG. 16B-2, FIG. 16C-1, FIG. 16C-2, FIG. 17A-1, FIG. 17A-2, FIG. 17B-1, FIG. 17B-2, FIG. 17C-1, FIG. 17C-2, FIG. 17D-1, and FIG. 17D-2, the timing at which the image of contents of data is displayed may be controlled. A saliency map can also be generated for moving images (video data). For example, when the image of contents of data newly appears, the evaluation value also changes. The image of contents of data may be highlighted or inhibited in view of the above phenomenon. For example, when colorful features are captured in the background image, it is difficult to highlight the image of contents of data. In order to handle such a situation, the display controller 20 displays the image of contents of data at the timing when those colorful features disappear.

The changes in display mode as described above may be performed in combination where appropriate. Some ways of changing the display mode according to the present embodiment are described as above with reference to FIG. 16A-1, FIG. 16A-2, FIG. 16B-1, FIG. 16B-2, FIG. 16C-1, FIG. 16C-2, FIG. 17A-1, FIG. 17A-2, FIG. 17B-1, FIG. 17B-2, FIG. 17C-1, FIG. 17C-2, FIG. 17D-1, FIG. 17D-2. Here, it should be noted that the way of presenting the image of contents of data (i.e., the display mode of the contents of data) is changed several times until the difference between the image of contents of data to be highlighted and the representative value of the background image or the like satisfies a desired level (until the difference becomes equal to or larger than a threshold). For example, the size or thickness of text or character is increased until the size or thickness satisfies a desired level. The brightness is enhanced until the brightness satisfies a desired level. Regarding the relation of complementary colors, the brightness of the background image may be increased until the brightness satisfies a desired level. The saturation is enhanced until the saturation satisfies a desired level. The distance to a virtual image is increased until the distance satisfies a desired level. The speed of blinking is increased until the speed satisfies a desired level.

FIG. 18 is a flowchart of the processes in which a display image is generated as the display controller 20 changes the display mode of the contents of data included in the display image, according to the present embodiment.

Firstly, the display data acquisition unit 21 obtains the display data from the data input unit 30 (step S1). The display image generator 24 generates a display image based on the obtained display data (step S2). This display image is displayed by the display device 10 as instructed by the image display unit 26.

Next, the front camera 35 captures the background image (step S3). The image data acquisition unit 22 obtains the image data captured by the front camera 35.

The evaluation image generator 23 combines the display image with the image data to generate evaluation image data (step S4). Then, the evaluation unit 25 generates a saliency map based on the evaluation image data (step S5).

Next, the evaluation unit 25 calculates the representative value of the image of contents of data of interest and the representative value of the background image or the like (step S6). The contents of data of interest indicate the contents of data to be highlighted or the contents of data to be inhibited, and the contents of data of interest are determined in advance based on the status of the vehicle. Whether the image of contents of data is to be highlighted or inhibited is determined in a relative manner, and thus whether the image of the same contents of data is to be highlighted or inhibited may vary depending on the combination of two or more images of contents of data to be displayed at the same time.

Next, the evaluation unit 25 determines whether or not the difference between the representative value of the image of contents of data of interest and the representative value of the background image or the like is equal to or greater than a threshold (step S7). As described above with reference to FIG. 14A, FIG. 14B, FIG. 14C, FIG. 14D, FIG. 15A, FIG. 15B, FIG. 15C, and FIG. 15D, when contents of data of interest are to be highlighted, whether the representative value of the image of contents of data of interest is greater than the threshold is determined. On the other hand, when contents of data of interest are to be inhibited, whether the representative value of the contents of data of interest is smaller than the threshold is determined.

When it is determined to be "YES" in the step S7, the evaluation unit 25 sends the instructions for highlighting or inhibiting the specified contents of data and the degree of highlighting or inhibition to the display image generator 24. In response to the received instructions and the degree of highlighting or inhibition, the display image generator 24 highlights or inhibits the way of presenting the specified contents of data by the specified degree (step S8). In other words, the display mode is changed.

As a result, a display image in which the contents of data to be highlighted are highlighted and the contents of data to be inhibited are inhibited can be displayed. In some embodiments, the degree of highlighting or inhibition is not sent, and only the instructions for highlighting or inhibiting the specified contents of data may be sent to the display image generator 24. By repeating the processes in FIG. 18, the image of contents of data is highlighted or inhibited to eventually satisfy a reference value.

In the subsequent cycle, the display mode of at least one item of contents of data may further be changed based on the image of contents of data that has been highlighted or inhibited (modified), the image data, a part of the modified display image that at least does not include the contents of data that have been modified.

When the image of particular contents of data is to be highlighted, it is satisfactory as long as the difference between the representative value of the image of contents of data of interest and the representative value of the background image or the like is equal to or greater than a threshold. However, there is some concern that the occupant of the vehicle may feel annoyed when the contents of data of interest stand out too much. In view of such circumstances, the evaluation unit 25 determines the degree of highlighting so as not to exceed the upper limit predetermined in view of the background image or the like. When the image of particular contents of data is to be inhibited, on the other hand, there is some concern that the occupant of the vehicle may feel difficult to see the contents of data of interest when the contents of data of interest do not stand out too much. In view of such circumstances, the evaluation unit 25 determines the degree of inhibition so as not to fall below the lower limit predetermined in view of the background image or the like.

In step S8, for example, the contents of data of interest are highlighted and the other items of contents of data may be inhibited. In a similar manner, for example, the contents of data of interest are inhibited and the other items of contents of data may be highlighted. In other words, the way of presenting a plurality of items of contents of data (i.e., the display mode of a plurality of items of contents of data) may be changed at the same time. Alternatively, the degree of highlighting a certain item of contents of data may be changed from the degree of highlighting another certain item of contents of data while highlighting both items of contents of data. In a similar manner, the degree of inhibiting a certain item of contents of data may be changed from the degree of inhibiting another certain item of contents of data while inhibiting both items of contents of data.

How the evaluation value changes when the image of contents of data is highlighted or inhibited is described below with reference to FIG. 19A, FIG. 19B, FIG. 19C, and FIG. 19D. FIG. 19A, FIG. 19B, FIG. 19C, and FIG. 19D are schematic diagrams of the temporal transition of each evaluation value when the image of contents of data is highlighted or inhibited, according to the present embodiment. The explanatory legends in FIG. 19A, FIG. 19B, FIG. 19C, and FIG. 19D are defined as follows.

Eimage: Evaluation Value (Representative Value) of Contents of Data

Eback: At least one Evaluation Value (Representative Value) of Background Image, Preceding Vehicle, and Other Contents of Data t: Time Th: Above Threshold (Degree of Highlighting or Inhibition of Contents of Data)

Figure 19A:
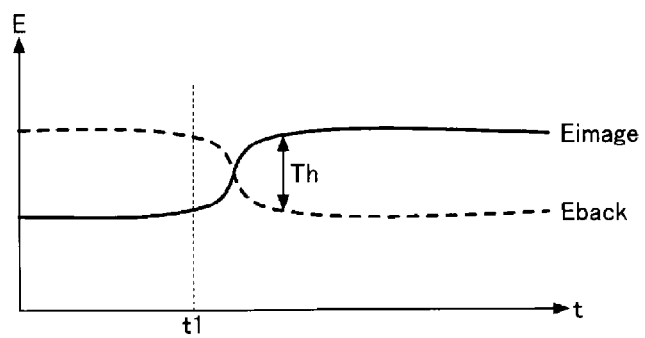
FIG. 19A, FIG. 19B, FIG. 19C, and FIG. 19D are schematic diagrams of the temporal transition of each evaluation value when the image of contents of data is highlighted or inhibited, according to an embodiment of the present disclosure.

FIG. 19A is a diagram illustrating the temporal change in evaluation value when the image of contents of data that is already displayed is to be highlighted, according to the present embodiment. The highlighting of the image of contents of data starts at time t1, and the evaluation value of the contents of data gradually increases. The difference in evaluation value that is equal to or greater than the threshold Th is eventually obtained.

Figure 19B:
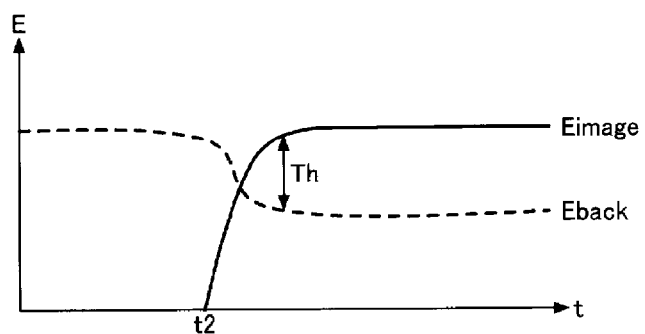

FIG. 19B is a diagram illustrating the temporal change in evaluation value when the image of contents of data to be highlighted is newly displayed, according to the present embodiment. The image of such contents of data is displayed at time t2. When the contents of data appears at the time t2, the evaluation value of the background image or the like changes. As the highlighting of the contents of data starts, the difference in evaluation value that is equal to or greater than the threshold Th is eventually obtained.

Figure 19C:
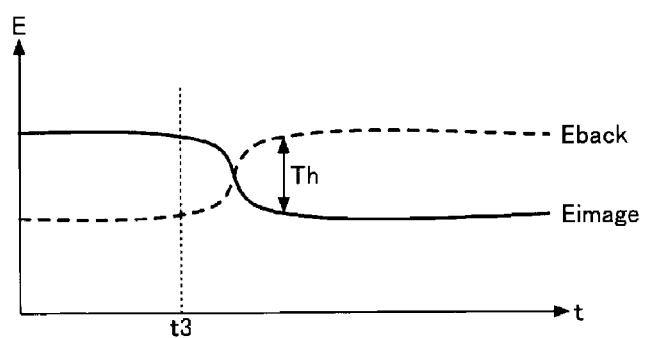

FIG. 19C is a diagram illustrating the temporal change in evaluation value when the contents of data that are already displayed are to be inhibited, according to the present embodiment. The inhibition of the contents of data starts at time t3, and the evaluation value of the contents of data gradually decreases. The difference in evaluation value that is equal to or greater than the threshold Th is eventually obtained.

Figure 19D:
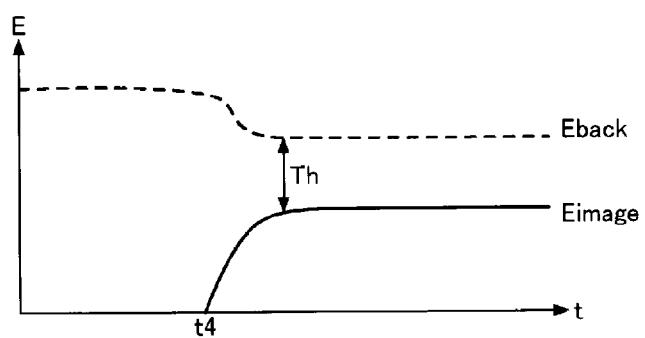

FIG. 19D is a diagram illustrating the temporal change in evaluation value when contents of data to be inhibited are newly displayed, according to the present embodiment. The image of such contents of data is displayed at time t4. When the contents of data appears at the time t4, the evaluation value of the background image or the like changes. As inhibition of the contents of data starts, the difference in evaluation value that is equal to or greater than the threshold Th is eventually obtained.

In FIG. 19A, FIG. 19B, FIG. 19C, and FIG. 19D, the image of contents of data is highlighted or inhibited such that the difference in evaluation value will be equal to or greater than the threshold Th. However, no limitation is indicated thereby, and "Eimage" and "Eback" may simply reversed.

Although the image of contents of data is highlighted or inhibited with respect to the background image or the like, the background image or the like temporally changes. As a result, the way of presenting contents of data (i.e., the display mode of contents of data) changes along the time axis.

As described above, the display system 1 according to the present embodiment can highlight or inhibit any desired item of contents of data. The highlighting of contents of data and the inhibition of other contents of data may be performed at the same time. Moreover, the contents of data to be highlighted and the background image to be inhibited can selectively be extracted, and with respect to what, how much the contents of data to be highlighted are to be highlighted to have a greater level of stimulative properties and characteristics than a threshold or how much the contents of data to be inhibited are to be inhibited to have a lower level of stimulative properties and characteristics than a threshold can quantitatively be determined.

It is considered that the visual recognizability of a virtual image over the background image is to be ensured in a simple manner in the related art. By contrast, an object of the present disclosure is to highlight or inhibit a virtual image with respect to the background image or the like.

In the related art, the brightness and colors are controlled. By contrast, in the embodiment of the present disclosure, not only the brightness and colors, but also the shape, size, display position, the distance to a virtual image, the display timing, or the display (flashing) intervals can be controlled.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

In the present embodiment, for example, whether or not the image of the preceding vehicle is excluded from the background image does not matter. However, no limitation is indicated thereby, and whether or not an object such as painting on the road such as a white line, a road sign, a pedestrian, and a small animal is to be included in the background image can selectively be determined. Moreover, whether or not such objects are to be included in the background image may be determined depending on the relative positions of such objects in the background image data.

For example, the virtual image I may be displayed upon performing camera-shake correction thereon, or the virtual image I may be displayed along the traffic lane as in the augmented reality (AR).

The display device 10 may be, for example, a liquid crystal display. The housing of the display controller 20 may be separate from the housing of the display device 10. For example, the display controller 20 and the display device 10 may independently be distributed. For example, a smartphone may be used as the display controller 20, and information may be displayed on the display that is built into the smartphone. Alternatively, a virtual image may be displayed on a combiner (light transmission member). For example, a display image may be projected towards the front windshield 91 or the combiner from the position of a sun visor.

Note also that the image data acquisition unit 22 is an example of an image data acquisition unit and that the display-image generator 24 is an example of a display-image generation unit. Note also that the evaluation image generator 23 is an example of an evaluation image generation unit and that the evaluation unit 25 is an example of an evaluation unit. Note also that the display controller 20 is an example of a display controller.

The present disclosure can be implemented in any convenient form, for example using dedicated hardware, or a mixture of dedicated hardware and software. The present disclosure may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present disclosure can be implemented as software, each and every aspect of the present disclosure thus encompasses computer software implementable on a programmable device. The computer software can be provided to the programmable device using any conventional carrier medium. The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

This patent application is based on and claims priority pursuant to 35 U.S.C. § 119(a) to Japanese Patent Application No. 2019-003692, filed on Jan. 11, 2019, in the Japan Patent Office, the entire disclosures of which is hereby incorporated by reference herein.

REFERENCE SINGS LIST

1 Display system
2 Vehicle-installed system
9 Vehicle
10 Display device
11 Car navigation system
20 Display controller
30 Data input unit

The invention claimed is:

1. A display controller for controlling a display device provided for a mobile object to display a display image including at least one item of contents of data, the display controller comprising:
circuitry configured to
obtain image data from an imaging device configured to capture an image around the mobile object, and
generate the display image,
superpose the display image on the image data to obtain an evaluation image data,
generate a saliency map based on the evaluation image data, the saliency map indicating degree of visual recognizability with respect to each pixel of the evaluation image data,
wherein the circuitry is further configured to change a display mode of the at least one item of contents of data included in the display image to increase visual recognizability of a desired item of contents of data included in the at least one item of contents of data to a level at least higher than visual recognizability of an area in the image data not including the desired item of contents of data based on the saliency map.

2. The display controller according to claim 1, wherein the circuitry is further configured to change the display mode so that the area not including the desired item of contents of data includes at least some of the image data and the display image.

3. The display controller according to claim 1, wherein the circuitry is further configured to change the display mode so that the area not including the desired item of contents of data includes other items of contents of data included in the image data and the display image, other than the desired item of contents of data.

4. The display controller according to claim 1, wherein the circuitry is further configured to change the display mode of the at least one item of contents of data based on the desired item of contents of data whose display mode has been changed, the image data, and a part of the display image that at least does not include the desired item of contents of data whose display mode has been changed.

5. The display controller according to claim 1, wherein the circuitry is further configured to calculate an evaluation value of the visual recognizability based on the evaluation image data obtained by combining the display image with the image data.

6. The display controller according to claim 1, wherein the circuitry is further configured to change at least one of size, thickness, brightness, relation of complementary colors, a level of color saturation, distance to a virtual image, blinking, a display position, and a display timing of the at least one item of contents of data to change the display mode of the at least one item of contents of data.

7. A display system, comprising:
the display controller according to claim 1; and
a display device configured to project the display image generated by the display controller onto a light transmission member.

8. The display system according to claim 7, wherein the light transmission member is a front windshield of the mobile object.

9. The display system according to claim 7, further comprising the imaging device configured to capture the image around the mobile object.

10. The mobile object comprising the display system according to claim 7.

11. A display controller for controlling a display device provided for a mobile object to display a display image including at least one item of contents of data, the display controller comprising:
circuitry configured to
obtain image data from an imaging device configured to capture an image around the mobile object, and
generate the display image,
wherein the circuitry is further configured to change a display mode of the at least one item of contents of data included in the display image to increase visual recognizability of a desired item of contents of data included in the at least one item of contents of data to a level at least higher than another visual recognizability of an area in the image data not including the desired item of contents of data,
wherein the circuitry is further configured to calculate an evaluation value of the visual recognizability based on evaluation image data obtained by combining the display image with the image data, and
wherein the circuitry is further configured to determine a degree of changing the display mode to control a difference between a first evaluation value indicative of the visual recognizability of the desired item of contents of data included in the display image and a second evaluation value indicative of the another visual recognizability of the image data and at least some of the display image to be equal to or greater than a predetermined threshold.

12. The display controller according to claim 11, wherein the image data obtained by the circuitry includes depth information.

13. The display controller according to claim 12, wherein the circuitry is further configured to calculate the evaluation value of the visual recognizability from the evaluation image data based on at least one of brightness, a complementary color, saturation, and depth information of the image data, each of which is included in the evaluation image data.

14. A display system, comprising:
the display controller according to claim 11; and
a display device configured to project the display image generated by the display controller onto a light transmission member.

15. The display system according to claim 14, wherein the light transmission member is a front windshield of the mobile object.

16. The display system according to claim 14, further comprising the imaging device configured to capture the image around the mobile object.

17. The mobile object comprising the display system according to claim 14.

18. A method of generating an image, the method comprising:
obtaining image data from an imaging device configured to capture an image around a mobile object;
generating a display image including at least one item of contents of data to be displayed by a display device provided for the mobile object;
superpose the display image on the image data to obtain an evaluation image data,
generate a saliency map based on the evaluation image data, the saliency map indicating degree of visual recognizability with respect to each pixel of the evaluation image data,
changing a display mode of the at least one item of contents of data included in the display image to increase visual recognizability of a desired item of contents of data included in the at least one item of contents of data to a level at least higher than visual recognizability of an area in the image data not including the desired item of contents of data based on the saliency map.

19. A non-transitory computer-readable medium storing computer readable code that, when executed, causes a computer system to carry out the method of claim 18.

* * * * *